US008849626B1

(12) United States Patent
Kumar et al.

(10) Patent No.: US 8,849,626 B1
(45) Date of Patent: Sep. 30, 2014

(54) SEMANTIC TRANSLATION OF STATEFLOW DIAGRAMS INTO INPUT/OUTPUT EXTENDED FINITE AUTOMATA AND AUTOMATED TEST GENERATION FOR SIMULINK/STATEFLOW DIAGRAMS

(75) Inventors: Ratnesh Kumar, Ames, IA (US); Meng Li, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 133 days.

(21) Appl. No.: 13/538,472

(22) Filed: Jun. 29, 2012

Related U.S. Application Data

(63) Continuation-in-part of application No. 13/165,907, filed on Jun. 22, 2011, now Pat. No. 8,655,636.

(60) Provisional application No. 61/357,568, filed on Jun. 23, 2010.

(51) Int. Cl.
G06F 17/50 (2006.01)

(52) U.S. Cl.
USPC ................. 703/2; 703/13; 717/106; 717/108; 717/114

(58) Field of Classification Search
USPC .......................... 703/2, 13; 716/106; 717/114
See application file for complete search history.

(56) References Cited

U.S. PATENT DOCUMENTS

| 7,093,231 B2* | 8/2006 | Nuss | 717/114 |
| 7,496,892 B2* | 2/2009 | Nuss | 717/114 |
| 7,698,668 B2* | 4/2010 | Balasubramanian et al. | 716/106 |
| 8,260,597 B1* | 9/2012 | Raghavan et al. | 703/13 |
| 2008/0086705 A1* | 4/2008 | Balasubramanian et al. | 716/5 |

OTHER PUBLICATIONS

Agrawal, Aditya et al., "Semantic Translation of Simulink/Stateflow Models to Hybrid Automata Using Graph Transformations", Electronic notes in Theoretical Computer Science, 109 (2004) 43-56.
Alur, Rajeev et al., "Symbolic Analysis for Improving Simulation Coverage of Simulink/Stateflow Models", EMSOFT'08, Oct. 19-24, 2008, Atlanta, GA, ACM 978-1-60558-468-3/08/10, 10 pages.
Caspi, Paul et al., "From Simulink to SCADEL/Lustre to TTA: a Layered Approach for Distributed Embedded Applications*", LCTES'03, Jun. 11-13, 2003, San Diego, CA, ACM 1-58113-647-1/03/0006, pp. 89-99.
CVX: Matlab Software for Disciplined Convex Programming, Version 1.22 (May 2012, Build 835). http://cvxr.com/cvx [retrieved from Internet on Jul. 12, 2012].
Gadkari, Ambar A. et al., "Automatic Generation of Test-Cases Using Model Checking for SL/SF Models", 4th International Workshop on Model Driven Engineering, Verification and Validation, 2007, pp. 33-42.
Jersak, Marek et al., "Embedded System Design using the SPI Workbench", Design Languages 2000, pp. 153-163.

(Continued)

Primary Examiner — Thai Phan
(74) Attorney, Agent, or Firm — McKee, Voorhees & Sease

(57) ABSTRACT

A method of translation of a chart associated with a graphical modeling environment into an input/output-extended finite automata (I/O-EFA) model is provided. The method includes receiving a representation of the chart and processing the representation of the chart with a computing device by (a) representing atomic models for each individual state of the chart, (b) applying composition rules to interconnect the atomic models while preserving state execution and transition behaviors to obtain the I/O-EFA model.

20 Claims, 11 Drawing Sheets

(56) References Cited

OTHER PUBLICATIONS

Li, Meng et al., "Stateflow to Extended finite Automata Translation" 2011 35th IEEE Annual Computer Software and Applications Conference Workshops, (COMP-SACW), pp. 1-6.

MathWorks, Simulink "Simulation and Model-Based Design", http://mathworks.com/products/simulink/index.html?sec=add on [retrieved from Internet on Jul. 12, 2012], 2 pages.

NuSMV: a new symbolic model checker, http://nusmv.fbk.eu/ [retrieved from Internet on Jul. 12, 2013] 3 pages.

Reactive Systems, Inc., Reactis V2012, How Do You Develop Software?, http://www.reactive-systems.com/ [retrieved from Internet on Jul. 12, 2012] 1 page.

Scaife, N. et al., "Defining and Translating a "Safe" Subset of Simulink/Stateflow into Lustre", EMSOFT '04: Proceedings of the 4th ACM International conference on Embedded Software, New York, NY: ACM, 2004, pp. 259-268.

T-VEC: We cover all Boundaries, http://t-vec.com [retrieved from Internet on Jul. 12, 2012], 1 page.

Tripakis, Stavros et al., "Translating Discrete-Time Simulink to Lustre", ACM Transactions on Embedded Computing Systems, vol. 4, No. 4, Nov. 2005, pp. 779-818.

Zhou, Changyan et al., "Modeling Simulink diagrams using Input/Output Extended Finite Automata", 2009 33rd Annual IEEE International Computer Software and Applications Conference, pp. 462-467.

Zhou, Changyan et al., "Semantic Translation of Simulink Diagrams to Input/Output Extended Finite Automata", Discrete Event Dyn Syst (2012) 22:223-247.

\* cited by examiner $$[d_a^s=2]\{en_s, d_a^s:=1, d_l^s:=-1 \text{ or } 1\}$$

$$[d_a^s=1 \wedge \neg (V_{\{e:o_e=s\}} g_e)]\{du_s, d_l^s:=-1 \text{ or } 1\}$$

SEMANTIC TRANSLATION OF STATEFLOW DIAGRAMS INTO INPUT/OUTPUT EXTENDED FINITE AUTOMATA AND AUTOMATED TEST GENERATION FOR SIMULINK/STATEFLOW DIAGRAMS

CROSS-REFERENCE TO RELATED APPLICATIONS

This application is a Continuation-in-Part of U.S. Ser. No. 13/165,907 filed Jun. 22, 2011 which claims priority under 35 U.S.C. §119 of a provisional application Ser. No. 61/357,568 filed Jun. 23, 2010, all of which are hereby incorporated by reference in its entirety.

GRANT REFERENCE

This invention was made with government support under Grant No. NSF-CCF-0811541 awarded by the National Science Foundation. The government has certain rights in the invention.

FIELD OF THE INVENTION

The present invention relates to a semantic translation approach for diagrams associated with graphical modeling and simulation environments or tools. The semantic translation generates a model which may be used for further analysis such as test generation and formal verification.

BACKGROUND OF THE INVENTION

Graphical modeling and simulation environments or tools allow users to construct and analyze models of processes or systems using diagrams. There are various examples of such tools commercially available. One such example is Simulink/Stateflow from The MathWorks, Inc. which is a popular commercial model-based development tool for many industrial domains. A further example of a graphical modeling and simulation environments is LabVIEW, available from National Instruments Corporation.

Typically, these diagrams describe computations or logic which can ultimately be implemented using application specific devices, computers, microcontrollers, FPGAs, integrated circuits, or computing devices. The diagrams are built using elements or blocks which are interconnected. The diagrams are created within a graphical modeling environment which defines the semantics for executing the diagrams. Software systems or descriptions of hardware systems may then be produced which exhibit the behavior of the model or portions thereof.

Although Simulink/Stateflow is designed for the simulation of the designs, it does not provide a model that makes it amenable for formal analysis such as verification and validation. For safety and security concerns, verification and testing must be performed on the Simulink/Stateflow designs and the generated code. What is needed is a way to translate a Stateflow chart into an Input/Output Extended Finite Automata (I/O-EFA) model which preserves discrete behaviors. Moreover, what is further needed is an automatic test generation approach for Simulink/Stateflow based on its translation to Input/Output Extended Finite Automata (I/O-EFA).

SUMMARY

Therefore, it is a primary object, feature, or advantage of the present invention to improve over the state of the art.

It is a further object, feature, or advantage of the present invention to provide a semantic translation approach which is recursive.

It is a still further object, feature, or advantage of the present invention to provide a semantic translation approach which is amenable to automated test generation and verification.

It is a still further object, feature, or advantage of the present invention to provide a semantic translation approach which has no special restriction on the types of blocks.

It is a still further object, feature, or advantage of the present invention to provide a semantic translation approach which is sound and complete.

It is a still further object, feature, or advantage of the present invention to translate a chart comprising event-driven blocks, such as a Stateflow chart into an I/O-EFA that preserves the discrete behaviors.

A still further object, feature, or advantage of the present invention is to provide an automatic test generation approach for Simulink/Stateflow based on its translation to Input/Output Extended Finite Automata (I/O-EFA).

Yet another object, feature, or advantage of the present invention is to provide model translation for model-based test generation.

One or more of these and/or other objects, features, and advantages will become apparent from the specification and claims that follow. No single embodiment need exhibit each and every object, feature, or advantage. The present invention contemplates that different embodiments may have different objects, features, or advantages.

Stateflow, a graphical interface tool for Matlab, is a common choice for design of event-driven software and systems. In order for it's offline analysis (testing/verification) or online analysis (monitoring), the Stateflow model must be converted to a form that is amenable to formal analysis. According to one aspect of the present invention, we provide a systematic method, which translates Stateflow into a formal model, called Input/Output Extended Finite Automata (I/O-EFA). The translation method treats each state of the Stateflow model as an atomic module, and applies composition/refinement rules for each feature (such as state-hierarchy, local events) recursively to obtain the entire model. The size of the translated model is linear in the size of the Stateflow chart. Our translation method is sound and complete in the sense that it preserves the discrete behaviors as observed at the sample times. Further, the translation method has been implemented in a Matlab tool, which outputs the translated I/O-EFA model that can itself be simulated in Matlab.

According to another aspect of the present invention, method of translation of a chart associated with a graphical modeling environment into an input/output-extended finite automata (I/O-EFA) model is provided. The method includes receiving a representation of the chart and processing the representation of the chart with a computing device by (a) representing atomic models for each individual state of the chart, (b) applying composition rules to interconnect the atomic models while preserving state execution and transition behaviors to obtain the I/O-EFA model. The step of processing may further include incorporating additional features of the chart into the I/O-EFA model by refining the I/O-EFA model at locations where the features of the chart reside. The method may further include applying a composition rule to integrate the chart and a diagram into the I/O-EFA model, said diagram comprising a plurality of blocks and said diagram being associated with a graphical modeling environment in which blocks within the diagram define semantics for executing the diagram. The composition rules may include a first rule for modeling states with OR-substates and a second rule for modeling states with AND-substates. The atomic models may each be represented by a tuple.

According to another aspect of the present invention, a computer-readable storage medium storing computer-executable instructions that are executed on a processing device is provided. The computer-executable instructions include instructions for receiving a data representation of a chart, said chart comprising a plurality of states and said chart being associated with a graphical modeling environment and instructions for processing the data representation of the chart to translate the chart into an input/output-extended finite automata model. The instructions for processing the data representation of the chart to translate the chart into the input/output-extended finite automata model may provide for (a) representing atomic models for each individual state of the chart, (b) applying composition rules to interconnect the atomic models while preserving state execution and transition behaviors to obtain the I/O-EFA model. The composition rules may include a first rule for modeling states with OR-substates and a second rule for modeling states with AND-substates. The instructions for processing may further include instructions for incorporating additional features of the chart into the I/O-EFA model by refining the I/O-EFA model at locations where the features of the chart reside. The computer-readable storage medium may further include instructions for applying a composition rule to integrate the chart and a diagram into the I/O-EFA model, said diagram comprising a plurality of blocks and said diagram being associated with a graphical modeling environment in which blocks within the diagram define semantics for executing the diagram. Each of the atomic models may be represented by a tuple.

According to another aspect of the present invention, an automatic test generation approach for Simulink/Stateflow is provided which is based on its translation to Input/Output Extended Finite Automata (I/O-EFA). The test generation problem requires identifying the executable paths of the I/O-EFA model and also generating a test input for those paths. Note in order to execute a path, a certain sequence of other paths must be executed first, which we automatically identify. The approach is implemented by applying two different techniques, model checking and constraint solving. Both test generation implementations are validated by a case study. The results show that both implementations can generate test cases as expected and the implementation based on constraint solving is in general faster.

According to another aspect of the present invention, a method of translation of a diagram associated with a graphical modeling environment into an input/output-extended finite automata (I/O-EFA) model is provided. The method includes receiving a representation of the diagram. The method further includes processing the representation of the diagram with a computing device by representing atomic models for elements of the diagram and applying composition rules to interconnect the atomic models while preserving state execution and transition behaviors to obtain the I/O-EFA model. The method further includes generating a test for the I/O-EFA model using the computing device, and executing the test for the I/O-EFA model using the computing device.

DETAILED DESCRIPTION

I. Introduction

Figure 1:
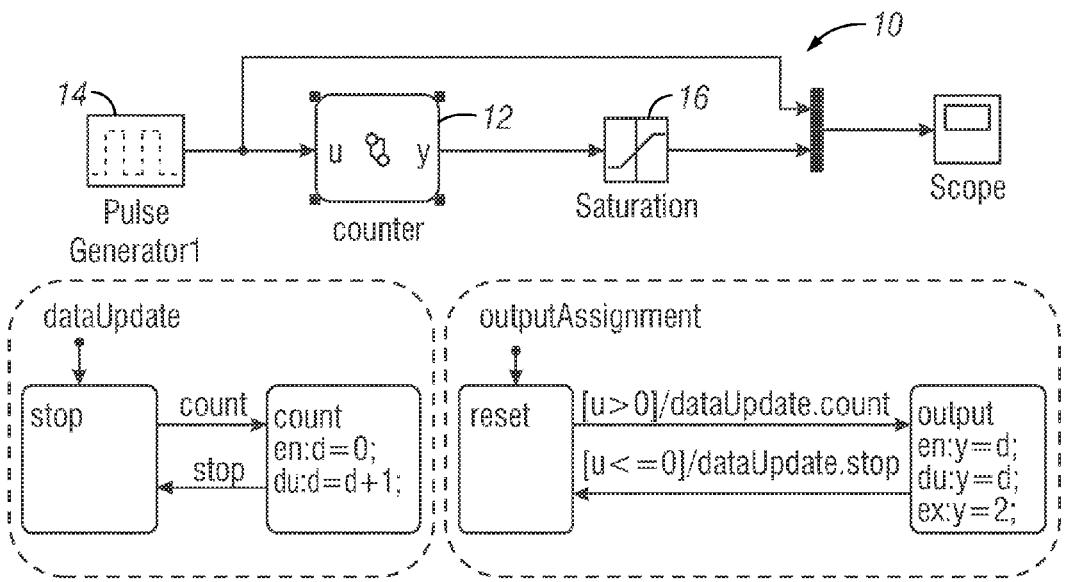
FIG. 1 is Simulink diagram of a counter system and the Stateflow chart of the counter.

Although the present invention may be used with diagrams from any number of graphical environments, Simulink/Stateflow (S/S) diagrams are used as representative examples of such diagrams. Simulink/Stateflow is a popular commercial model-based development tool for many industrial domains, such as power systems, aircraft, automotives and chemical plants. Simulink is much better for handling continuous systems, whereas Stateflow is much better for handling state based problems. Owing to the correctness, safety, security, etc. requirements of such systems, methods to analyze the system designs are needed. Simulink/Stateflow however has originally been designed for the simulation of the designs, and does not provide a model that makes it amenable for formal analysis such as verification and validation.

In our previous work [1], we introduced a recursive modeling method to translate Simulink diagram to Input/Output Extended Finite Automata (I/O-EFA), which is a formal model of a reactive untimed infinite state system, amenable to formal analysis. The present invention completes the modeling approach by further extending it to allow the translation of Stateflow charts that are event-driven blocks.

Stateflow, which has been adopted from StateChart, allows hierarchical modeling of discrete behaviors consisting of parallel and exclusive decompositions, with tedious semantics, which makes it challenging to capture and translate into formal models. Several authors have attempted different forms of Stateflow translation. Scaife et al. [2] translated a subset of Simulink/Stateflow into Lustre and verified the model using a model checking tool called Lesar. Gadkari et al. [3] proposed a translation from Simulink/Stateflow to Symbolic Analysis Laboratory (SAL). However, few of the prior works have considered the translation from Stateflow to an automaton, which preserves the discrete behaviors (behaviors observed at discrete time steps when the inputs are sampled and the outputs are computed).

In this work, we continue to use I/O-EFA as the target model for translation so as to retain consistency with our previous work that translated the Simulink diagrams. In order to have our modeling process recursive, we treat the individual states of a Stateflow chart to be the most elementary constructs for modeling, and define the atomic models for them. Next, two composition rules are defined to interconnect the simpler models to form the more complex models for the "AND" versus "OR" states, preserving their state execution and transition behaviors. By viewing the Stateflow chart's hierarchical structure as a tree, we recursively apply the two composition rules in a bottom-up algorithm to obtain the overall I/O-EFA model. Finally, the additional Stateflow features, such as event broadcasting and interlevel transitions, are incorporated by refining the model at locations where the features reside. Furthermore, a composition rule between Stateflow and Simulink models is introduced to combine them into a single complete model.

We have also implemented our algorithm into an automated translation tool SS2EFA, written in the Matlab script. A counter and a complex motor control system have been used as the case studies for the proposed translation method and the tool. The simulation results show that the translated model simulates correctly the original Simulink diagram at each time step. The contributions of the present invention include:
- We have developed a recursive method to translate a Stateflow chart into an I/O-EFA that preserves the discrete behaviors. The overall model of a Stateflow chart has the same structure as the model of a Simulink diagram proposed in our previous work, which makes the two models integrable.
- The translated model shows different paths to represent all the computational sequences, which makes it easier for formal analysis.
- We have developed an automated translation tool that is ready for use. The translated I/O-EFA model can itself be simulated in Matlab (by treating it as a "flat" Stateflow model).

II. Introduction to I/O-EFA

An I/O-EFA is a symbolic description of a reactive untimed infinite state system in form of an automaton, extended with discrete variables of inputs, outputs and data.

Definition 1 An I/O-EFA is a tuple $P=(L, D, U, Y, \Sigma, \Delta, L_0, D_0, L_m, E)$ where
L is the set of locations (symbolic-states),
$D=D_1 \times \ldots \times D_n$ is the set of typed data (numeric-states),
$U=U_1 \times \ldots \times U_m$ is the set of typed numeric-inputs,
$Y=Y_1 \times \ldots \times Y_p$ is the set of typed numeric-outputs,
$\Sigma$ is the set of symbolic-inputs,
$\Delta$ is the set of symbolic-outputs,
$L_0 \subseteq L$ is the initial location,
$D_0 \subseteq D$ is the set of initial-data values,
$L_m \subseteq L$ is the final location, and
E is the set of edges, and each $e \in E$ is a 7-tuple, $e=(o_e, t_e, \sigma_e, \delta_e, G_e, f_e, h_e)$, where
  $o_e \in L$ is the origin location,
  $t_e \in L$ is the terminal location,
  $\sigma_e \in \Sigma \cup \{\epsilon\}$ is the symbolic-input,
  $\delta_e \in \Delta \cup \{\epsilon\}$ is the symbolic-output,
  $G_e \subseteq D \times U$ is the enabling guard (a predicate),
  $f_e: D \times U \to D$ is the data-update function,
  $h_e: D \times U \to Y$ is the output-assignment function.

I/O-EFA P starts from an initial location $l_0 \in L_0$ with initial data $d_0 \in D_0$. When at a state (l, d), a transition $e \in E$ with $o_e=l$ is enabled, if the input $\sigma_e$ arrives, and the data d and input u are such that the guard $G_e(d, u)$ holds. P transitions from location $o_e$ to location $t_e$ through the execution of the enabled transition e and at the same time the data value is updated to $f_e(d, u)$, whereas the output variable is assigned the value $h_e(d, u)$ and a discrete output $\delta_e$ is emitted. In what follows below, the data update and output assignments are performed together in a single action.

III. Atomic Model for States

States are the most basic components in a Stateflow chart in that a simplest Stateflow chart can just be a single state. Stateflow allows states to be organized hierarchically by allowing states to possess substates, and same holds for substates. A state that is down (resp., up) one step in the hierarchy is termed a substate (resp., superstate). We represent the most basic components of a Stateflow chart as atomic models, which are the smallest modules that are interconnected (following the semantics of the hierarchy and other Stateflow features as described in the following sections) to build the model of an overall Stateflow chart.

Figure 2:
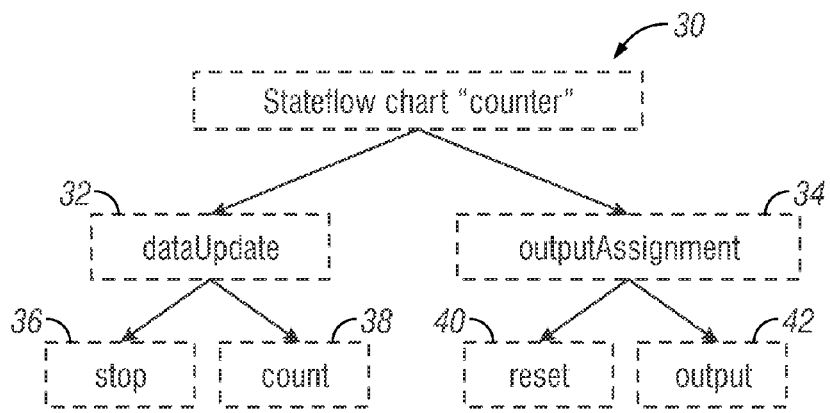
FIG. 2 illustrates a hierarchical structure of the Counter's Stateflow chart.

Consider a Simulink diagram of a counter system 10 shown in FIG. 1. The counter itself is a Stateflow chart 12, which gets the input from the signal source "pulse generator" 14 to switch between the "count" and the "stop" mode. The saturation 16 is a Simulink block that sets the lower and upper bounds for the output values. As shown in FIG. 2, the Stateflow chart 30 consists of six states with two parallel top-level states 32, 34 and two exclusive substates (36, 38 and 40, 42, respectively) for each of them. This hierarchical structure of the states is shown in a tree format in FIG. 2. Each node of the tree can be modeled as an atomic I/O-EFA model, which we describe below in this section.

The behavior of a Stateflow state comprises of three phases: entering, executing and exiting, where
  Entering phase marks the state as active and next performs all the entry actions;
  Executing phase evaluates the entire set of outgoing transitions. If no outgoing transition is enabled, the during actions, along with the enabled on-event actions, are performed;
  Exiting phase performs all the exit actions and marks the state inactive.

Figure 3:
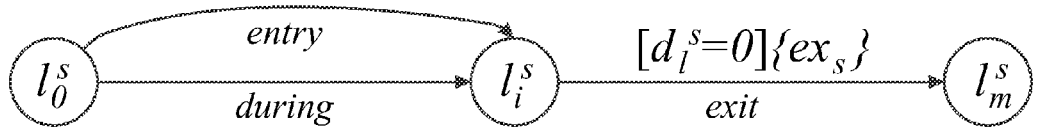
FIG. 3 is an Atomic Model of Stateflow state.

According to the above behaviors, an individual state s of a Stateflow can be represented in the form of an I/O-EFA of FIG. 3.

As can be seen from the figure, the atomic I/O-EFA model has three locations $l_0^s, l_i^s, l_m^s$ for differentiating the activation versus the deactivation process, where the transition
  $l_0^s \to l_i^s$ captures the activation process, including the state entry and during actions, and the transition
  $l_i^s \to l_m^s$ captures the deactivation process, including the state exit actions and the transitions to higher/lower level.

The atomic model has internal data-variables $d_a^s, d_l^s, \{d^e | o_e = s\}$ for controlling the execution flow, where
  $d_a^s$ is to determine if the particular state is inactive/active/newly active as captured by the three values (0/1/2),
  $d_l^s$ is to determine the direction of flow in the hierarchy: down/same/up as captured by the three values (−1/0/1), and
  $d^e$ is to determine if the outgoing transition e is active or not (0/1).

A formal description of this atomic model is given in the following algorithm.

Algorithm 1: A Stateflow state s can be represented as an I/O-EFA $(L^s, D^s, -, -, -, -, \{l_0^s\}, D_0^s -, E^s)$ where
  $L^s = \{l_0^s, l_i^s, l_m^s\}$ $D^s$ is the set of data variables consisting of $\{d_a^s, d_l^s\} \cup \{d^e | o_e = s\}$, $D_0^s$ is the set of initial data values, and $E^s = \{l_0^s, l_i^s, [d_a^s = 2], \{en_s, d_a^s := 1, d_l^s := -1$ (if s has a substrate) or 1 otherwise)$\}\}$ $\cup \{l_0^s, l_i^s, [d_a^s = 1 \wedge \neg (\vee_{[e:o_e = s]} g_e)], \{du_s, d_l^s := -1$ (if s has a substrate) or 1 (otherwise)$\}\}$ $\cup \{l_i^s, l_m^s, [d_l^s = 0], \{ex_s\}\}$, where $en_s$ is the entry actions of s, $du_s$ is the during actions of s, $ex_s$ is the exit actions of s, and $g_e$ is the guard of the transition e.

The above atomic model captures a Stateflow state's behavior as follows:

When the Stateflow state s is newly activated and the location is transitioned to $l_0^s$, $d_s^a$ is set to 2 (as described later). Accordingly, initially the transition labeled "entry" is enabled, and the state entry action $en_s$ is executed, and also $d_a^s$ is set to 1 to notate that the state has already been activated; $d_l^s$ is set to −1 (if s has a substate and so the execution flow should be downward into the hierarchy to a substate) or 1 (if s has no substate and so the execution flow can only be upward to a superstate) to indicate that the state has finished executing in this time step, and execution flow should go to another state;

Once the state has been activated, $d_a^s$ equals 1 and upon arrival at $l_0^s$ if none of the outgoing transitions is enabled, the transition labeled "during" is executed causing the state during action $du_s$ to be executed; $d_a^s$ remains unchanged since the state is still in the execution phase; $d_l^s$ is set to −1 or 1 as described above in the previous bullet;

When leaving the state, $d_l^s$ is set to 0 (as discussed later), so upon arrival to $l_i^s$ the transition labeled "exit" is executed, causing the execution of the state exit action $ex_s$.

IV. Modeling State Hierarchy

Stateflow provides for hierarchical modeling of discrete behaviors by allowing a state to possess substates which can be organized into a tree structure. The root node of the tree is the Stateflow chart, the internal nodes are the substates of the Stateflow chart, and the leaves are the bottom-level states with no substates of their own. As described in the previous section, each state, which is a node of the tree, is modeled as an atomic model of the type shown in FIG. 3. The next step in the modeling is to connect these atomic models according to the type (AND vs. OR) of the children nodes.

In case of AND substates, all substates must be active simultaneously and must execute according to their execution order at each time step, whereas in case of OR substates, at most one of the substates can be active at each time step, and one of the substates is deemed default substate which gets activated at the first time step its superstate becomes active. For the execution order of a state with substates, two rules must be followed: 1) The substates can be executed only when their superstate is activated, and 2) A state finishes execution only when all its substates have been evaluated for execution.

After the execution of a transition labeled "entry" or "during" of a state, all its outgoing transitions are evaluated for enablement (if no outgoing transition is enabled, another execution of "during" action is performed). The enabled transition with the highest priority is selected for execution, and the particular transition is activated. Also the exit phase of the state is initiated. Exit phase generally has the following execution sequence: The condition action of the activated transition, the exit actions of the leaving state, the transition action of the activated transition and the entry action of the entering state. Furthermore, if there are multiple exit actions to be executed (i.e. the leaving state has substates), then those are ordered according to the following rule: The leaving state, along with all its substates, exits by starting from the last-entered state's exit action, and progressing in reverse order to the first-entered state's exit action.

With the above knowledge of the semantics of the AND/OR hierarchy, we can now model the hierarchical behaviors by defining the corresponding composition rules. We first introduce a few notations to make the presentation clearer.

Definition 2: A complex state $\hat{s}$ is the state system consisting of the state s and all its immediate substates. $\hat{s}$ is said to be an AND- (resp., OR-) complex state if it possesses AND (resp., OR) substates. We define $|\hat{s}|$ to indicate the number of substates in the complex state $\hat{s}$.

A. Modeling State with OR-substates

Following the state transition semantics, the modeling rule for a state with OR-substates can be defined by the following algorithm. For an OR-complex state $\hat{s}$ we use s* to denote its default state.

Figure 4:
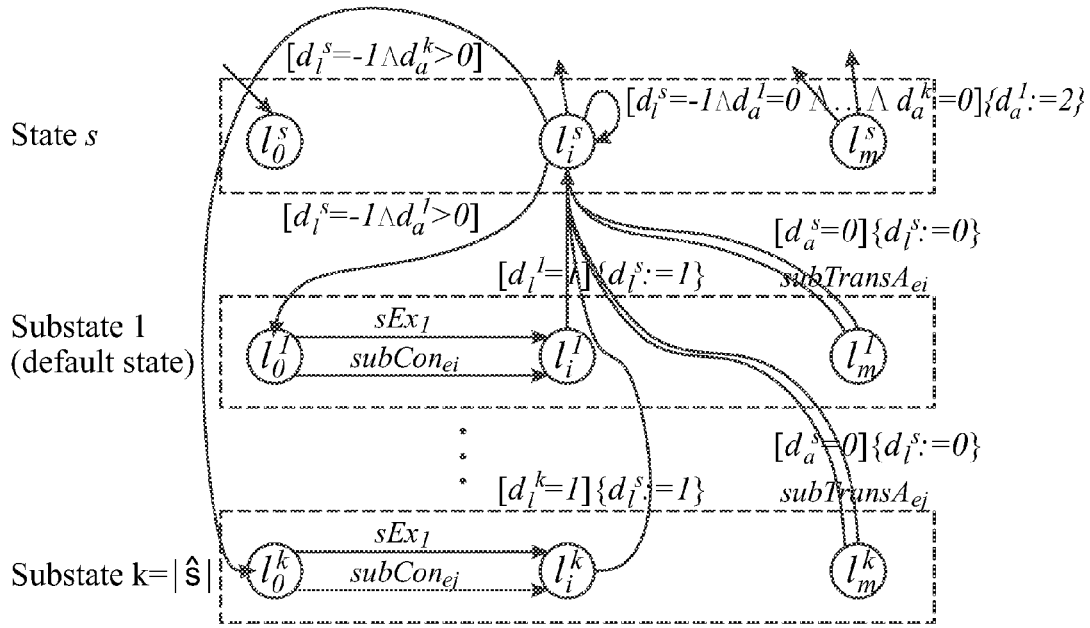
FIG. 4 illustrates OR-Complex State modeling. $\forall r \in \hat{s}-\{s\}$: $sEx_r \equiv [d_a^s=0]\{d_a^r:=0;\ d_l^r:=-1\ \text{or}\ 0\}$; $\forall e:o_e \in \hat{s}-\{s\}$:sub$Con_{e=[da^{o_e}=1 \wedge g_e \wedge d_a^s > 0]}\{ca_e;\ d_a^{o_e}:=0;\ d^e:=1;\ d_l^{o_e}:=-1\ \text{or}\ 0\}$ and subTransA$_e \equiv [d_a^s > 0 \wedge d^e=1]\{ta_e;\ d_a^{t_e}:=2;\ d^e:=0;\ d_l^s:=1\}$.

Algorithm 2: An OR-complex state $\hat{s}$ can be represented as an I/O-EFA ($L^{\hat{s}}, D^{\hat{s}}, -, -, -, -, \{l_0^{\hat{s}}\}, D_0^{\hat{s}}, -, E^{\hat{s}}$), where $L^{\hat{s}} = \cup_{s \in \hat{s}} L^s$, $D^{\hat{s}} = \Pi_{s \in \hat{s}} D^s$, $D_0^{\hat{s}} = \Pi_{s \in \hat{s}} D_0^s$, $E^{\hat{s}} = E \cup_{s \in \hat{s}} E^s$, where E is all newly introduced edges as shown in FIG. 4:

$\cup_{r \in \hat{s} - \{s\}} \{l_i^s, l_0^r [d_l^s = -1 \wedge d_a^r > 0], -\}$ $\cup \{l_i^s, l_i^{\hat{s}}, [d_l^s = -1 \wedge (\wedge_{r \in \hat{s} - \{s\}} (d_a^r = 0))], \{d_a^{s*} := 2\}\}$ $\cup_{r \in \hat{s} - \{s\}} \{l_0^r, l_i^r, [d_a^r = 0], \{d_a^r := 0; d_l^r := -1 \text{ if s has a substrate}) \text{ or 0 (otherwise)}\}\}$ $\cup_{r \in \hat{s} - \{s\}, \{e: o_e = r\}} \{(l_0^r, l_i^r, [d_a^r = 1 \wedge g_e \wedge d_a^s > 0], \{ca_e; d_a^r := 0; d^e := 1; d_l^r := -1 \text{ (if s has a substrate) or 0 (otherwise)}\}\}$ $\cup_{r \in \hat{s} - \{s\}, \{e: o_e = r\}} \{l_0^r, l_i^r [d_a^r = 1 \wedge g_e \wedge d_a^s > 0], \{ca_e; d_a^r := 0; d^e := 1; d_l^r := -1 \text{ (if s has a substrate) or 0 (otherwise)}\}\}$ $\cup_{r \in \hat{s} - \{s\}} \{l_i^r, l_i^s, [d_l^r = 1], \{d_l^s := 1\}\}$ $\cup_{r \in \hat{s} - \{s\}} \{l_m^r, l_i^s, [d_a^s = 0], \{d_l^s := 0\}\}$ $\cup_{r \in \hat{s} - \{s\}, \{e: o_e = r\}} \{l_m^r, l_i^s, [d_a^s > 0 \wedge d^e = 1], \{ta_e; d_a^{t_e} := 2; d^e := 0; d_l^s := 1\}\}$ where $g_e$ is guard condition of the transition e, $ca_e$ is condition action of the transition e, $ta_e$ is transition action of the transition e, and $o_e$ (resp., $t_e$) is the origin (resp., terminal) state of edge e.

B. Modeling State with AND-substates

For an AND-complex state $\hat{s}$, its substates, although simultaneously active, are executed in a certain order. With a slight abuse of notation we use r to denote the substate whose execution order is r among all the substates of $\hat{s}$. Also for simplicity of notation let k=$|\hat{s}|$. The modeling rule for a state with AND-substates is defined as follows.

Figure 5:
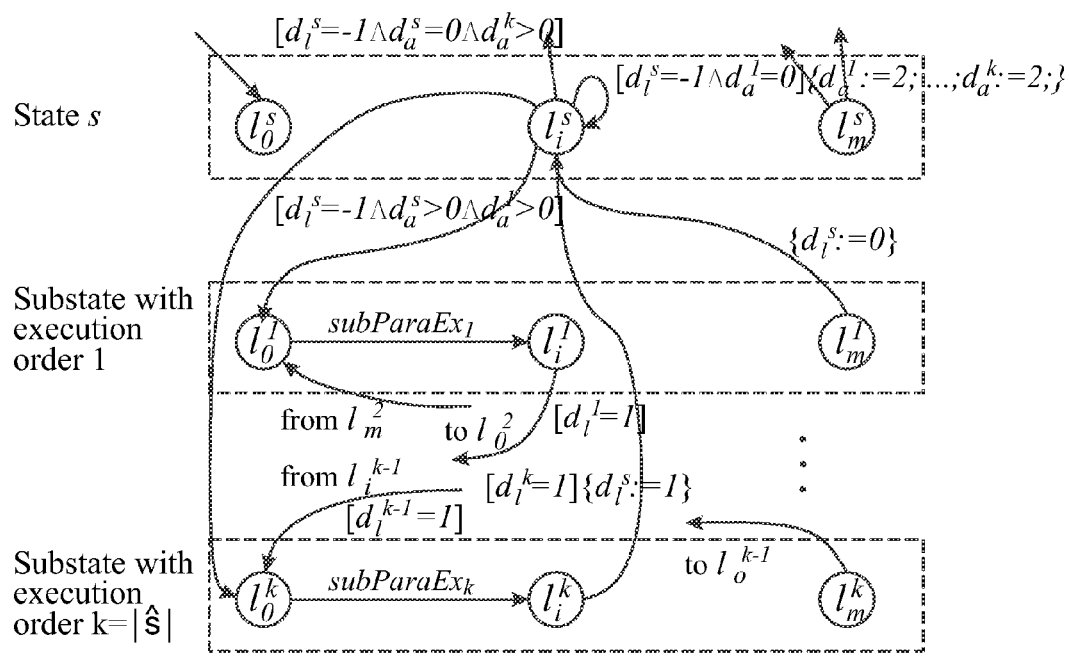
FIG. 5 illustrates AND-Complex state modeling. $\forall r \in \hat{s}-\{s\}$:subParaEx$_r \equiv [d_a^r=1 \wedge d_a^s=0]\{d_a^r:=0;\ d_l^r:=-1\ \text{or}\ 0\}$

Algorithm 3: An AND-complex state $\hat{s}$ can be represented as an I/O-EFA ($L^{\hat{s}}, D^{\hat{s}}, -, -, -, -, \{l_0^{\hat{s}}\}, D_0^{\hat{s}}, -, E^{\hat{s}}$), where $L^{\hat{s}} = \cup_{s \in \hat{s}} L^s$, $D^{\hat{s}} = \Pi_{s \in \hat{s}} D^s$, $D_0^{\hat{s}} = \Pi_{s \in \hat{s}} D_0^s$, $E^{\hat{s}} = E \cup_{s \in \hat{s}} E^s$, where E is all newly introduced edges as shown in FIG. 5:

$\{l_i^s, l_0^1, [d_l^s = -1 \wedge d_a^s > 0 \wedge |0], -\}$ $\cup \{l_i^s, l_i^s [d_l^s = -1 \wedge d_a^1 = 0], \{\forall r \in \hat{s} - \{s\}: d_a^r := 2\}\}$ $\cup \{l_i^k, l_i^s, [d_l^k = 1], \{d_l^s := 1\}\}$ $\cup_{r \in \hat{s} - \{s, k\}} \{(l_i^r, l_0^{r+1}, [d_l^r = 1], -\}$ $\cup_{r \in \hat{s} - \{s\}} \{l_0^r, l_i^r, [d_a^r = 1 \wedge d_a^s = 0], \{d_a^r := 0; d_l^r := 1 \text{ (if s has a substrate) or 0 (otherwise)}\}\}$ $\cup \{l_i^s, l_i^k, [d_l^s = -1 \wedge d_a^s = 0 \wedge d_a^k > 0], -\}$ $\cup_{r \in \hat{s}-\{s,1\}} \{1_m{}^r, 1_0{}^{r-1}, -, -\}$
$\cup \{1_m{}^1, 1_l{}^s, -, d_l{}^s:=0)\}$ With the above two composition rules, an overall model of a Stateflow chart, capturing only the state hierarchy feature, can be obtained by applying the rules recursively, over the tree structure of the state hierarchy, in a bottom-up fashion.

V. Model Refinement for Other Features

Besides the state hierarchy, Stateflow provides many additional features, such as events, historical node and interlevel transitions. We capture these features into our model by refining the I/O-EFA model obtained by recursively applying Algorithms 1-3. We illustrate the model refinement by modeling one of the important features of Stateflow, namely a local event which is a commonly used event type.

A local event is triggered at a certain source state as part of one of the actions, where along with the event name, the destination states for the event broadcast are also specified. When an event is triggered, it is immediately broadcast to its destination state for evaluation. At this point, the destination state, including all of its substates, is executed by treating the event condition to be true in all of the guard conditions where it appears. Then the execution flow returns to the breakpoint where the event was triggered and resumes the execution.

The Stateflow event semantics permits an infinite chaining of events since each event can cause an action in its destination state that triggers a new or the same event. Such recursive behavior cannot be captured in the I/O-EFA modeling framework. However, practical systems avoid infinite chaining of events by way of satisfying the following requirements [3], which we assume to hold:

Local events can be sent only to parallel states,
Transitions out of parallel states are forbidden,
Loops in broadcasting of events are forbidden, and
Local events can be sent only to already-visited states.

Figure 6:
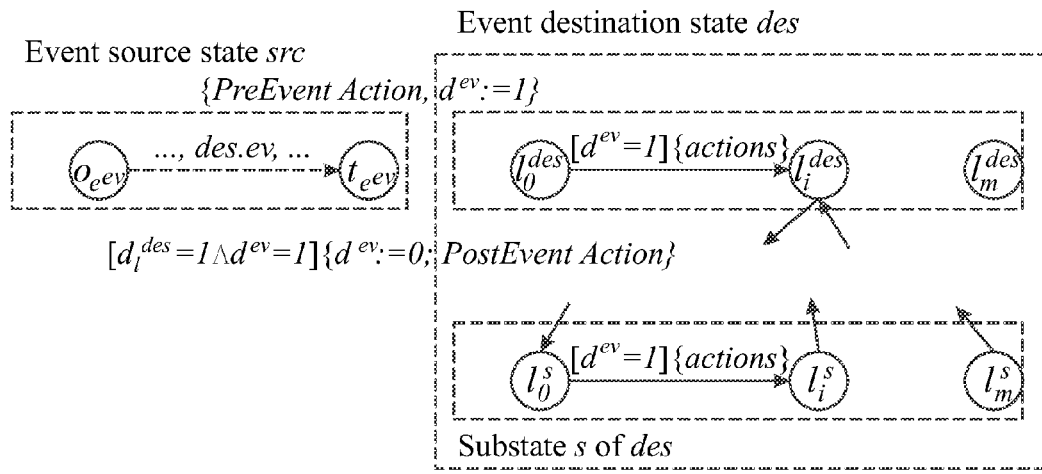
FIG. 6 illustrates an event modeling (dotted arrow denotes deleted edge).

For local event ev that is triggered in some source state src of a Stateflow chart, let $e^{ev} \in E$ be an edge that broadcasts the event ev. The model refinement step for modeling the local event behavior requires replacing the event-triggering edge $e^{ev}$ with a pair of edges between the event source state src and the event destination state des, one in each direction (see FIG. 6 for illustration). Also letting $E^{ev}$ denote the set of edges in the destination state's I/O-EFA model where the event ev is received, then for each edge $e \in E^{ev}$, its event label $\sigma_e(=ev)$ is replaced by the guard condition $[d^{ev}=1]$, where the binary variable $d^{ev}$ captures whether or not the event ev has been triggered.

Algorithm 4: Given an I/O-EFA model (L, D, -, -, -, -, $L_0$, $D_0$, -, E) obtained from recursive application of Algorithms 1-3, an edge $e^{ev} \in E$ that broadcasts an event ev to the destination state des, and a set of edges $E^{ev}$ in the destination state that receive the event (i.e., $\forall e \in E^{ev}: \sigma_e=ev$), the refined I/O-EFA model is given by (L, D, -, -, -, -, $L_0$, $D_0$, -, E'), where $E' = [E|_{\{oe \rightarrow [d^{ev}=1]e \in E^{ev}\}} - \{e^{ev}\}]$
$\cup \{o_e{}^{ev}, 1_0{}^{des}, -, \{\text{PreEventAction}, d^{ev}:=1\}, -\}$
$\cup \{1_l{}^{des}, t_e{}^{ev}, [d_1{}^{des}=1 \land d^{ev}=1], \{d^{ev}:=0; \text{PostEventAction}\}\}$ where PreEventAction (resp., PostEventAction) denotes all the guard conditions and actions appearing on the event-triggering edge prior to (resp., after) the event-broadcast label, and $E|_{\{oe \rightarrow [d^{ev}=1]|e \in E_0\}}$ is the set of edges obtained by replacing the event label $\sigma_e(=ev)$ of each edge $e \in E^{ev}$ by the guard condition $[d^{ev}=1]$ (no relabeling is done for the remaining edges in $E - E^{ev}$).

Recursive application of Algorithm 4 with respect to each event-triggering edge is required to complete the model-refinement step for modeling the local events. Additional features such as historical node and interlevel transitions can also be modeled by similar refinement steps, conforming to their respective Stateflow semantics. Due to space limitations, those are not included.

VI. Final Touches: Finalizing the Model

Figure 7:
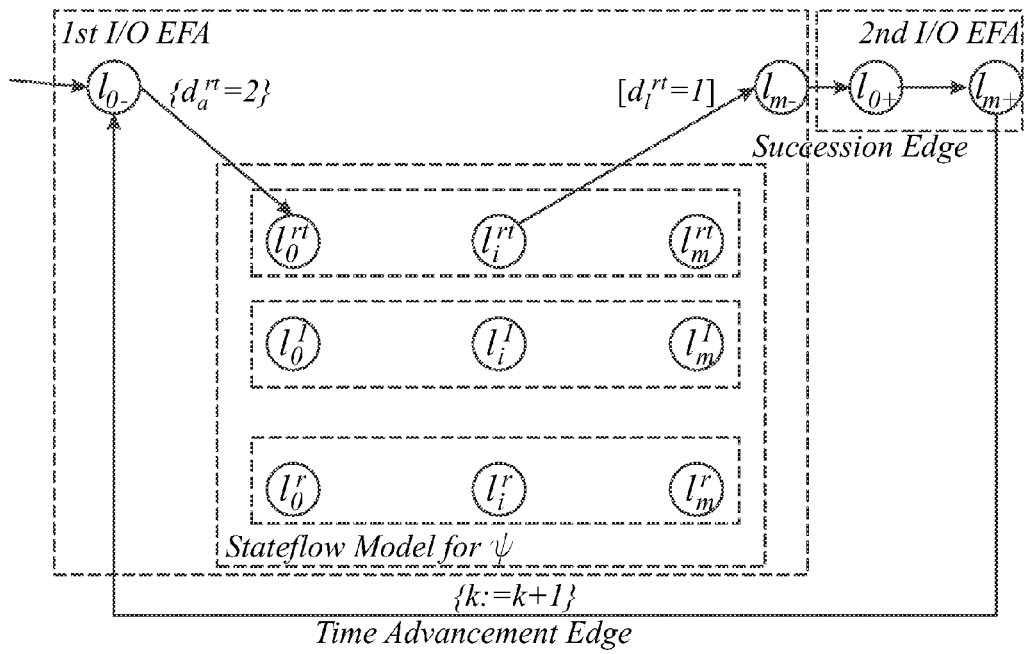
FIG. 7 illustrates a final model of a Stateflow chart.

At the top level, a Stateflow chart is also a Simulink block (the distinction being that it is event-driven as opposed to time-driven). So to be consistent, at the very top level, the model of a Stateflow chart ought to resemble the model of a time-driven Simulink block as introduced in [1]. Accordingly, the model of a Stateflow chart obtained from applying Algorithms 1-4 is adapted by adding another layer as shown in FIG. 7. As is the case with the model of a time-driven Simulink block (see [1] for the details), the final model of a Stateflow chart is composed of two I/O-EFA parts that are linked by a "succession edge" (connects the final location of $1^{st}$ I/O-EFA to initial location of $2^{nd}$ I/O-EFA) and a "time-advancement edge" (connects the final location of $2^{nd}$ I/O-EFA to initial location of $1^{st}$ I/O-EFA and increments a time-step counter k). The final model of a Stateflow chart is obtained as follows.

Algorithm 5: Given an I/O-EFA model (L, D, -, -, -, -, $L_0$, $D_0$, -, E) obtained from recursive application of Algorithms 1-4 and model refinement concerning other features, the final model of a Stateflow chart is composed of two I/O-EFAs connected through succession and time-advancement edges as in FIG. 7.

The $1^{st}$ I/O-EFA model is given by ($L_-$, $D_-$, $U_-$, $Y_-$, -, -, $\{1_{0-}\}$, $D_{0-}$, $\{1_{m-}\}$, $E_-$), where
$L_- = L \cup \{1_{0-}, 1_{m-}\}$,
$D_- = D$,
$D_{0-} = D_0$, and
$E_- = \{1_{0-}, 1_0{}^{rt}, -, \{d_a{}^{rt}:=2,\}\}$
$\cup \{1_l{}^{rt}, 1_{m-}, [d_l{}^{rt}=1]\}$.

The $2^{nd}$ I/O-EFA model is given by ($L_+$, -, $U_+$, $Y_+$, -, -, $\{1_{0+}\}$, -, $\{1_{m+}\}$, $E_+$), where
$L_+ = \{1_{0+}, 1_{m+}\}$, and
$E_+ = \{1_{0+}, 1_{m+}, -, -\}$.

FIG. 7 depicts the final model of a Stateflow chart, ready to be integrated with models of other components. The $1^{st}$ I/O-EFA model goes down the state hierarchy to perform the Stateflow computations. When the Stateflow computations of the current time step are completed, the first I/O-EFA model returns to its final location in the top layer. The $2^{nd}$ I/O-EFA model is vacuous and is only included to retain consistency with the Simulink model.

Example 1

Consider the counter system of FIG. 1. It can be translated into an I/O-EFA model as follows:

1. Modeling states: We first construct atomic model for each of the seven states (including the Stateflow root) of FIG. 2.
2. Modeling state hierarchy: We apply OR Complex State Composition Rule (Algorithm 2) on the models obtained in step 1 of the two bottom-level OR complex states, and AND Complex State Composition Rule (Algorithm 3) on models obtained in step 1 of the top-level AND complex state.
3. Modeling local events: Each edge in the model obtained in step 2 containing the event "count" or "stop" is replaced with a pair of edges to connect the source state "outputAssignment" and the destination state "dataUpdate", in either direction. At the same time the evaluation of "count" (resp., "stop") is modified to $d^{ev1}=1$ (resp., $d^{ev2}=1$).

Figure 8A:
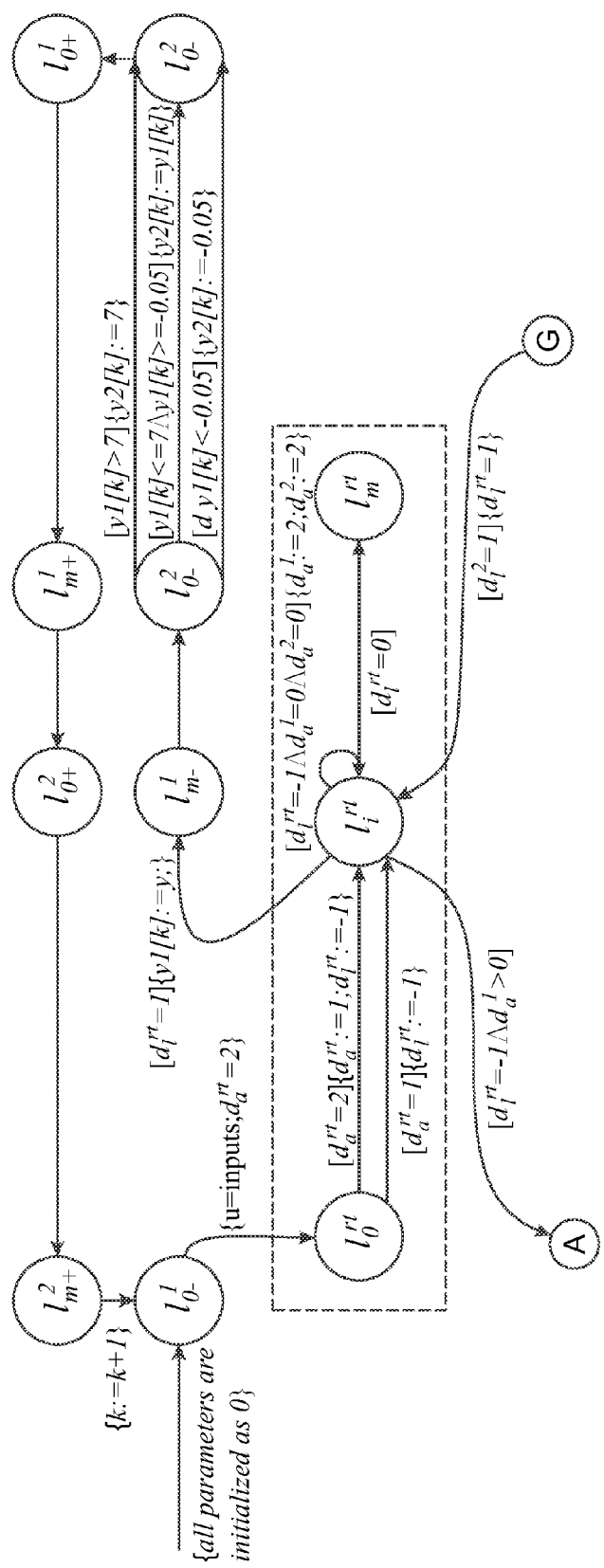
FIG. 8 illustrates a complete I/O-EFA model (some edges whose guards are never satisfied are omitted for simplicity) for counter system of FIG. 1.
Figure 8B:
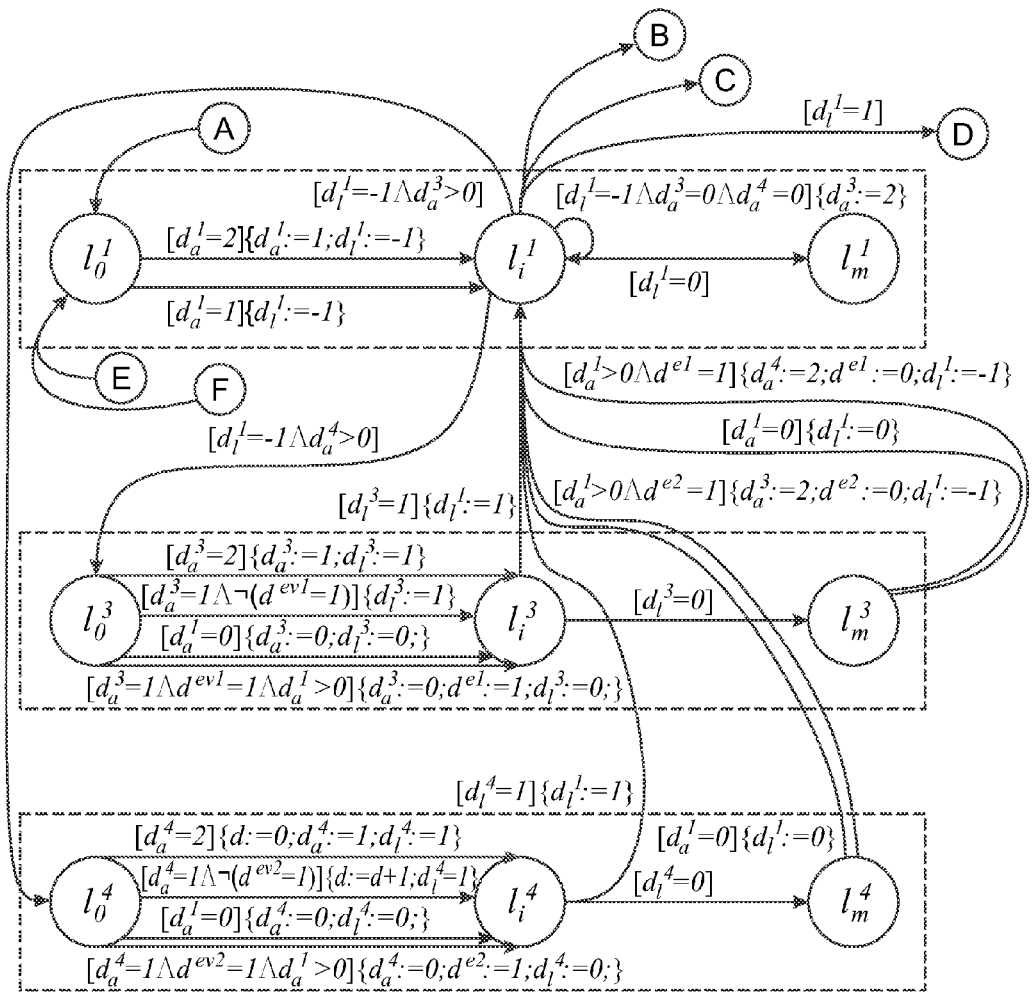
Figure 8C:
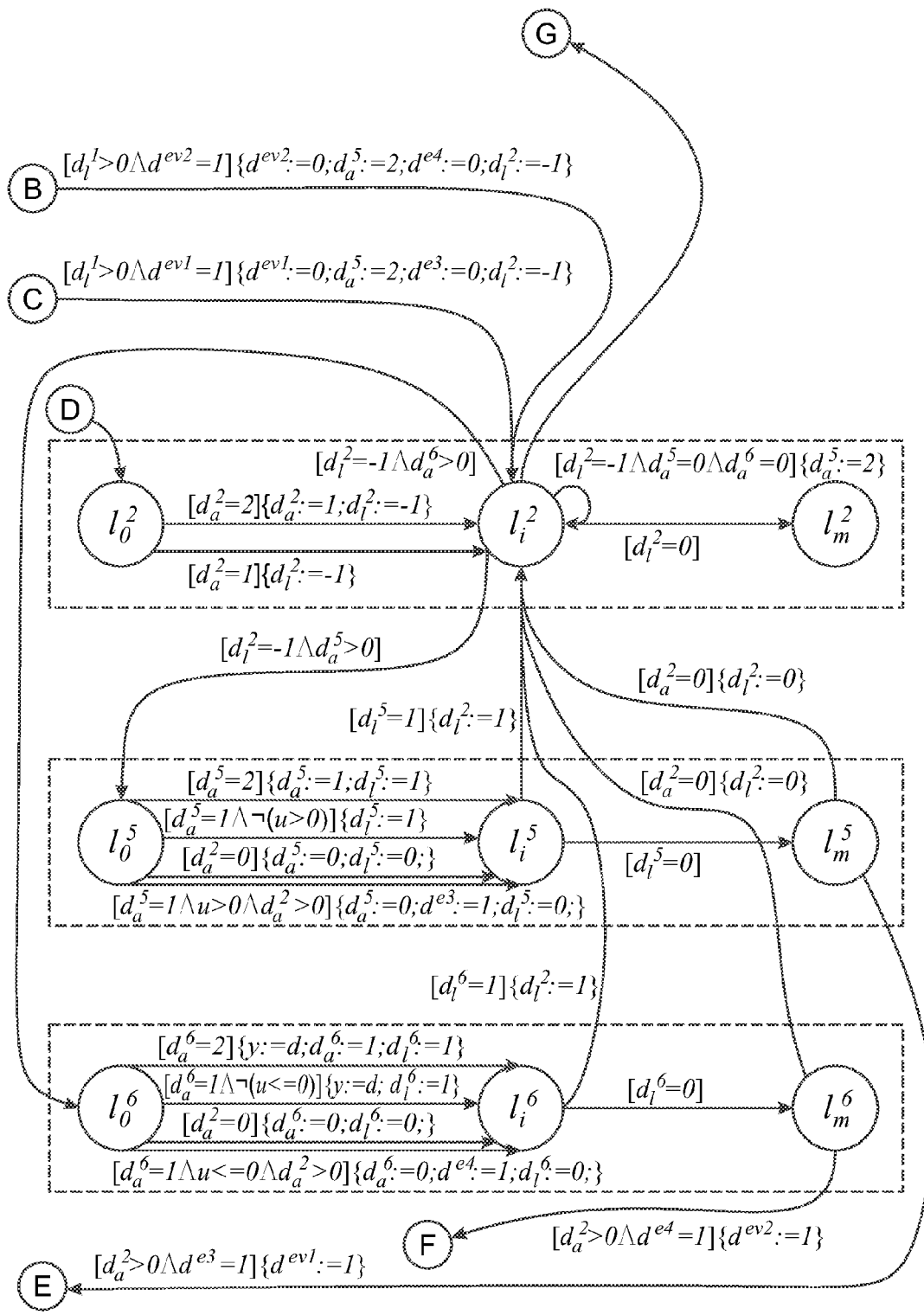

4. Obtaining final model: The model obtained in step 3 is augmented by applying Algorithm 5 to obtain a final model (this step introduces four extra locations, and a few extra edges as shown in FIG. 7. Finally, the I/O-EFA model for Stateflow chart (of counter) is combined with the I/O-EFA model of Simulink block (of saturation) using the connecting rule introduced in [1]. The result is shown in FIG. 8.

VII. Validation of Stateflow Modeling

The Stateflow modeling approach described above, along with the Simulink modeling method of our previous work [1], written in the Matlab script, has been implemented in an automated translation tool SS2EFA. Upon specifying a source Simulink/Stateflow model file, the tool can be executed to output the corresponding I/O-EFA model in form of a "flat" Stateflow chart, which can itself be simulated in Matlab. The result of simulating the I/O-EFA is the same as that of simulating the source Simulink/Stateflow model.

Example 2

Figure 9:
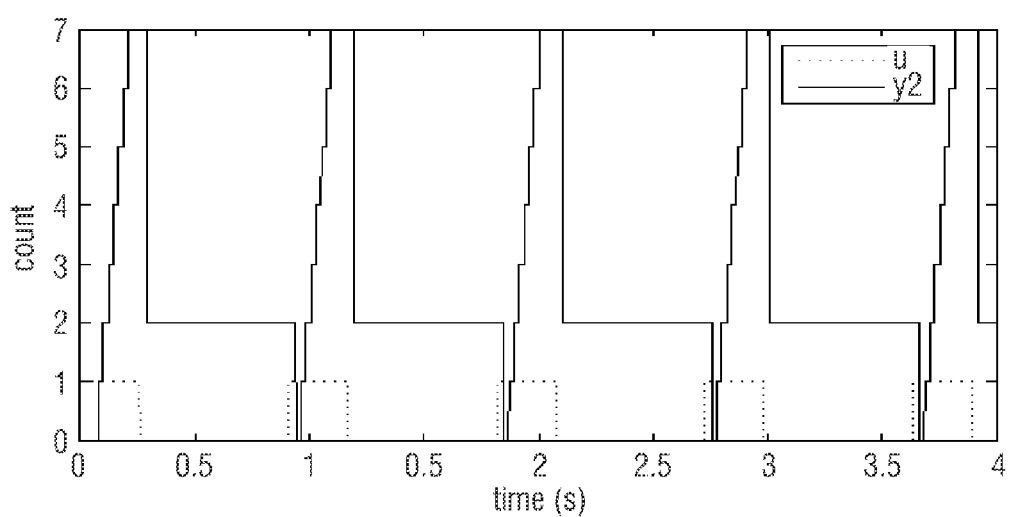
FIG. 9 illustrates a simulation result comparison between the I/O-EFA model of counter system (left) and the original counter system (right).
Figure 10:
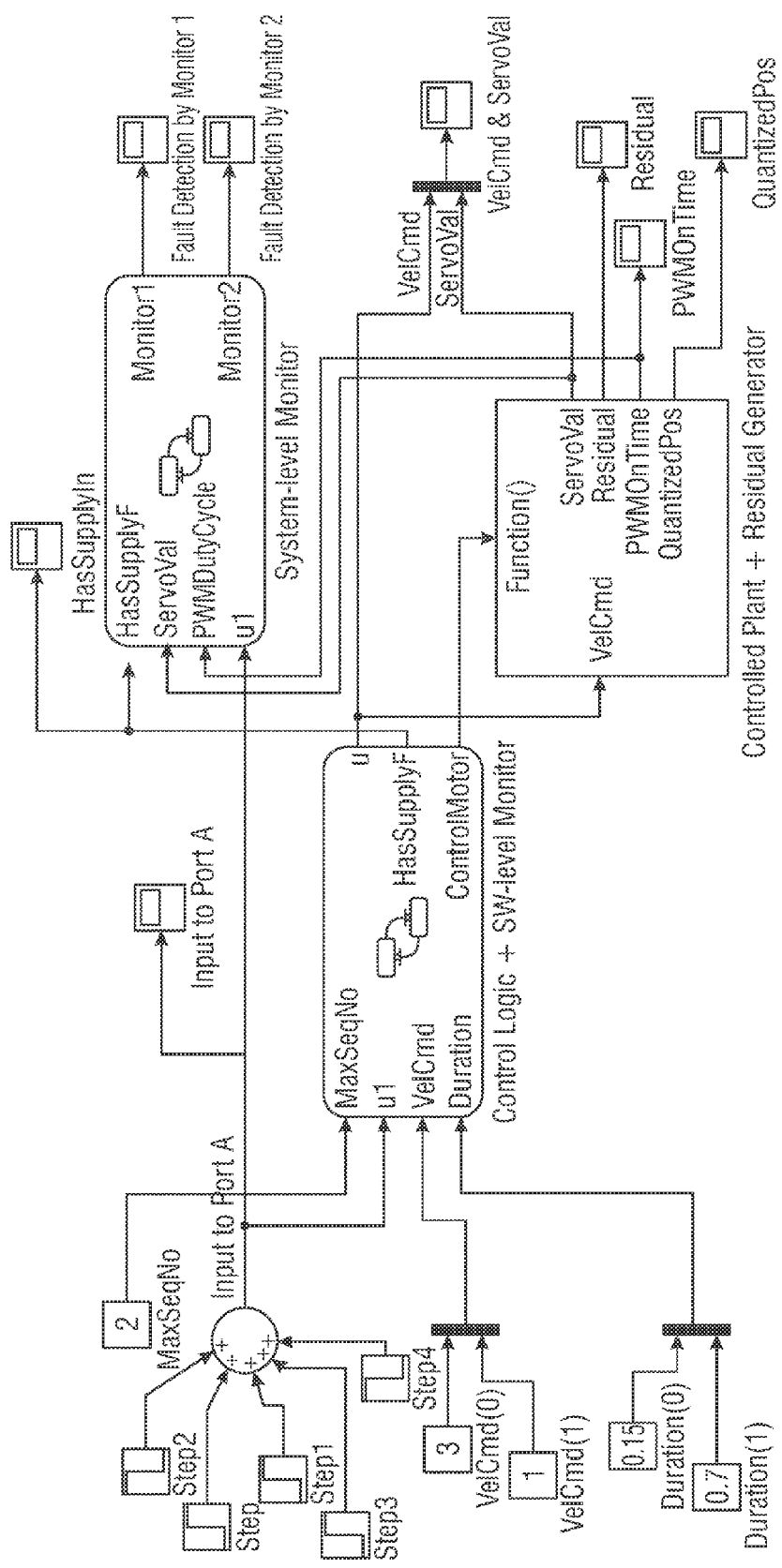
FIG. 10 illustrates a Simulink/Stateflow model of servo velocity control.

The simulation result comparison between the I/O-EFA model of the counter (see FIG. 8) and the original counter system (see FIG. 1) is shown in FIG. 9. The simulation (using Intel Core 2 Duo P8400 2.27 GHz, 2 GB RAM) time is 4 seconds with sampling period of 0.03 seconds, and the results are consistent with the behaviors of the counter.

Example 3

Figure 11:
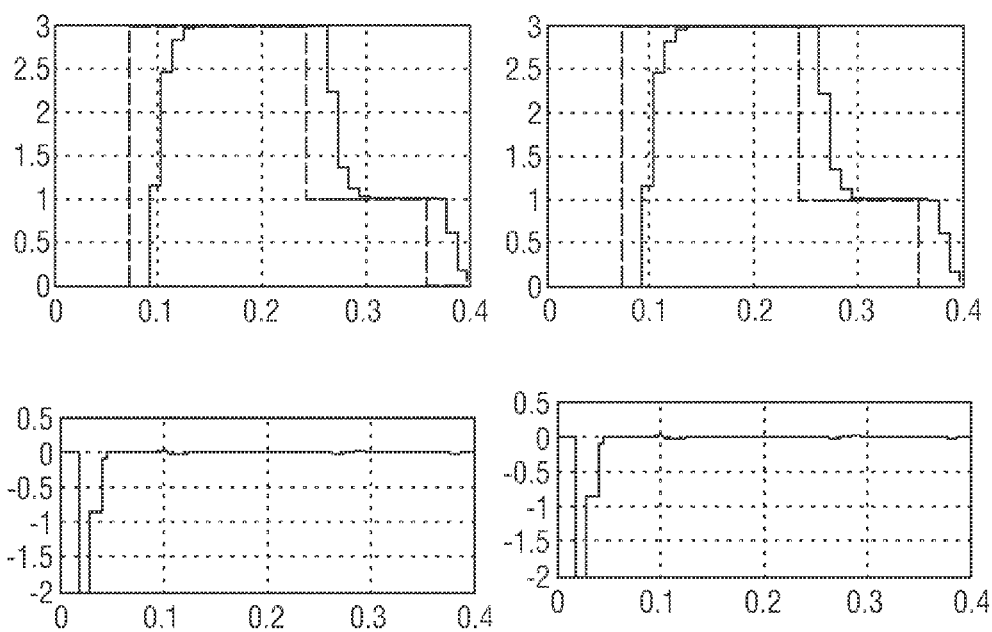
FIG. 11 illustrates a Simulation results for the velocity set point and actual servo velocity (top) and residue (bottom); left (resp., right) figures are for translated I/O-EFA model (resp., original Simulink/Stateflow model of servo system).

This example is of a servo velocity control system consisting of a controller, a fault monitor (both written in Stateflow), and a motor (written in Simulink). The Simulink/Stateflow diagram of the servo velocity control system is translated by our translation tool. The CPU time (using Intel Core 2 Duo P8400 2.27 GHz, 2 GB RAM) for the translation is 45.1 seconds and the translated model has 382 locations and 646 edges. The simulation result of the translated model (shown in FIG. 11) is identical to the discrete behaviors of the original Simulink/Stateflow model.

VIII. Introduction to Model-based Automatic Test Generation for Simulink/Stateflow Using Extended Finite Automaton As previously explained, Simulink/Stateflow [4] is a model-based development tool, which is widely used in many industrial domains, such as power systems, nuclear plants, aircraft, and automotives. Code generators are used within the Simulink/Stateflow to automatically generate the embedded software for the target system from the Simulink/Stateflow diagram, and thereby considerably increasing the productivity.

The existing code generators cannot guarantee that the generated code complies correctly the functional behaviors specified in the design. Verification and testing of the generated code is necessary to find errors in the code generation process and thus avoid software faults in any future use of the system.

Model-based test generation is an essential step in the model-based development process. It aims to validate that the object code to be implemented in the target processor complies with the design requirements. For Simulink/Stateflow, model-based test generation intends to validate whether the generated code (for example ANSI C) preserves the functional behaviors of the Simulink/Stateflow diagram.

Several type of errors may occur in the implementation process from the Simulink/Stateflow diagram to the target code, such as:

Errors in the Simulink/Stateflow diagram models will get carried over.

Errors in the automatic code generator for the Simulink/Stateflow diagram caused for example by finite precision arithmetic or timing constraints.

Any human errors in the selection of code generation options, library naming/inclusion, and others.

A model-based approach to reveal these errors is to create a set of test cases from Simulink/Stateflow and then execute them on the generated code to see if the test passes. Any failed test cases can be used to find the errors introduced during the code generation process.

Since Simulink/Stateflow has originally been designed for the simulation purposes, automated test generation for Simulink/Stateflow diagram is greatly needed to identify the errors. Several authors have tried different ways of test generation and verification for Simulink/Stateflow diagram. Scaife et al. [2] are able to translate a subset of Simulink/Stateflow into Lustre and verify the model using a model checking tool called Lesar. Gadkari et al. [3] have translated Simulink/Stateflow to a formal language, called Symbolic Analysis Laboratory (SAL), and they generate test cases based on SAL model checking Reactis [5] and TVEC [6] are two popular commercial tools for automated test generation for Simulink/Stateflow models. In our case, we derive the test suite based on the translation from Simulink/Stateflow to an automaton, which preserves the discrete behaviors (behaviors observed at discrete time steps when the inputs are sampled and the outputs are computed).

In our previous works [1] [7] [8] and as explained above, we introduced a recursive method to translate a Simulink/Stateflow diagram to an Input/Output Extended Finite Automata (I/O-EFA), which is a formal model of reactive untimed infinite state system, amenable to formal analysis. It captures each computation cycle of Simulink/Stateflow in form of an automata extended with data-variables to capture internal states and also the input and output variables. One aspect of the present invention provides a method to generate test cases for the Simulink/Stateflow diagram based on the corresponding I/O-EFA derived using the approach of [1] [7] [8]. To provide coverage for all computation flows of a Simulink/Stateflow diagram which corresponds to the execution paths in the translated I/O-EFA model, each execution path is analyzed for feasibility and reachability, and test cases are generated accordingly. The test generation approach is implemented by using two techniques, model-checking and constraint solving using mathematical optimization. The model-checking based implementation abstracts the I/O-EFA and checks each execution path for eventual reachability (note in order to execute a path some other sequence of paths may have to be executed in earlier cycles and hence the requirement of eventual reachability); while the constraint solving based implementation recursively evaluates the longer and longer path-sequences and the associated predicate for reachability. The test cases are generated from the counterexamples (resp. path-sequence predicates) for the case of model-checking (resp. constraint solving) process.

We have integrated the translation tool along with both the test generation implementations into an automated test generation tool, written in Matlab script. A simple example of a counter has been used as the case study to validate and compare the test generation implementations. The test generation results show that both of the implementation methods can generate the expected test cases while the constraint solving based approach is in general faster. The contributions of this aspect of the present invention are:
- We have developed a systematic test generation method for I/O-EFA models that representing the computations of a Simulink/Stateflow diagram.
- Two implementation techniques, model-checking and constraint solving, are implemented and compared.
- We have developed an automated test generation tool based on the above two techniques within the Matlab environment.

IX. Test Generation Based on I/O-EFA

As previously explained, an I/O-EFA is a symbolic description of a reactive untimed infinite state system in form of an automaton, extended with discrete variables of inputs, outputs and data. In addition to the description provided above, for notational convenience, if $d \in D$ and $u \in U$ is such that for an edge $e \in E$, $G_e(d, u)$ hold, then letting $d':=f_e(d, u)$ and $y:=h_e(d, u)$, we write $$(o_e, d) \xrightarrow{\sigma_{e,u,\delta_e,y}} (t_e, d')$$

to denote the state transition from $(o_e, d)$ to $(t_e, d')$ under the input $(\sigma_e, u)$ and producing the output $(\delta_e, y)$.

Our previous works [1] [7] [8] and our work above presented a translation approach from a Simulink/Stateflow diagram to an I/OEFA model while preserving the discrete behaviors observed at sample times. In such an I/O-EFA model, each transition sequence from the initial location $l_0$ back to the initial location $l_0$ through the time advancement edge $e=(l_m, l_0, -, -, -, -, \{k:=k+1\})$ represents a computation sequence of the Simulink/Stateflow diagram at a sampling time. Note for the time advancement edge e, it holds that $h_e \equiv \{k:=k+1\}$ that advances the discrete time counter by a single step. Such a transition sequence is called a computation path as defined next.

Definition 3: A computation path (or simply a c-path) $\pi$ in an I/O-EFA P=(L, D, $$\pi \in \{e_0^\pi \ldots e_{|\pi|-1}^\pi \in E^* \mid o_{e_0^\pi}^\pi, t_{e_{|\pi|-1}^\pi}^\pi \in L_0,$$

$$h_{e_{|\pi|-1}^\pi} \equiv \{k := k+1\}, \forall i \in [1, |\pi|-1] : o_{e_i^\pi}^\pi = t_{e_{i-1}^\pi}^\pi \}.$$

Our test generation approach is to find a set of input sequences, also called test cases, which execute a certain set of computation sequences specified by a desired coverage criterion. For this, first the paths, representing those computation sequences, are located in the I/O-EFA model, and next the input sequences which activate those paths are obtained. Our previous Simulink/Stateflow to I/O-EFA translation approach formalizes and automates this mapping from computation sequences of Simulink/Stateflow diagram to the c-paths in the translated I/O-EFA model.

Example 4

Figure 12:
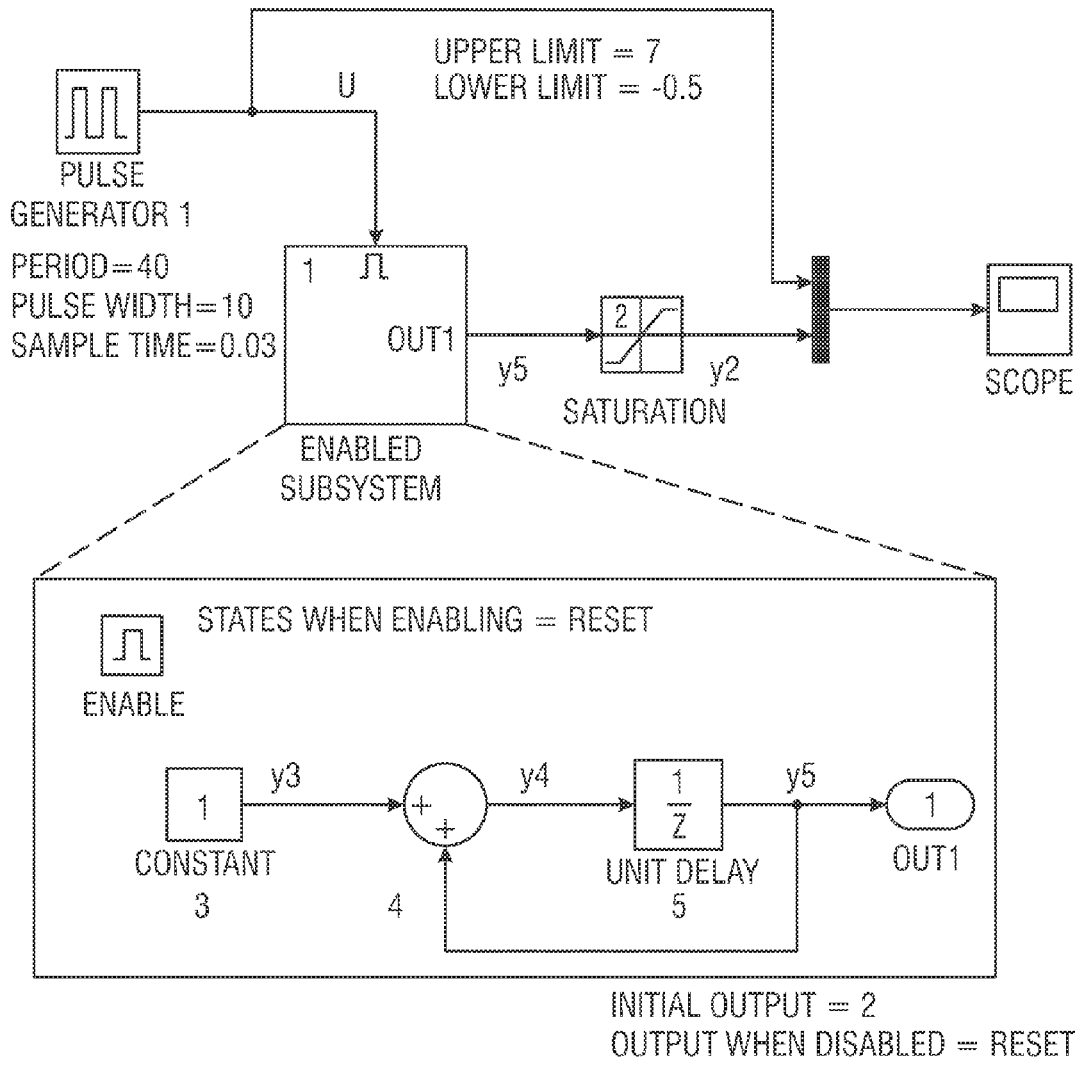
FIG. 12 is a Simulink diagram of a counter system.
Figure 13:
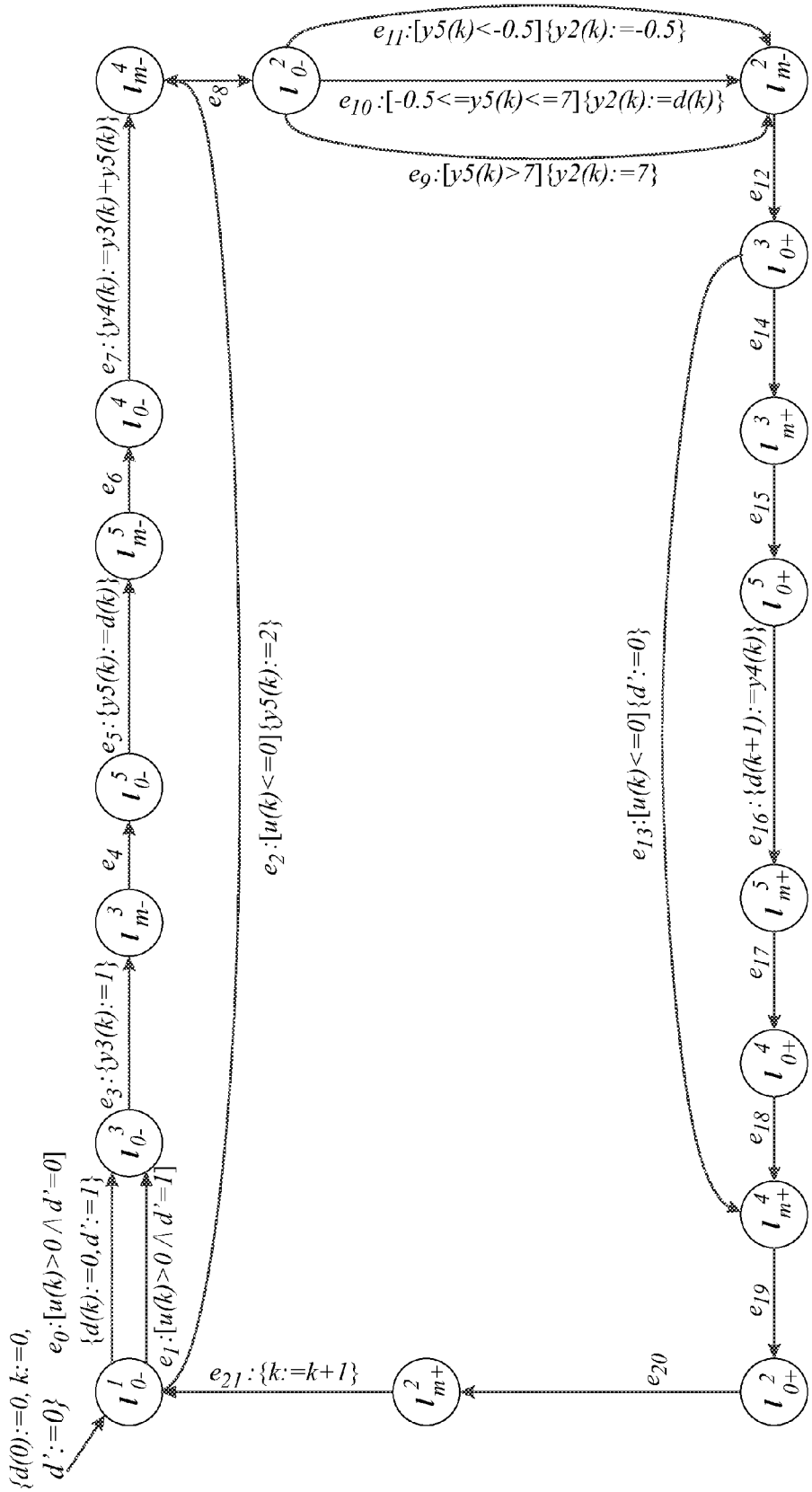
FIG. 13 is an I/O-EFA model of the counter system of FIG. 12.

Consider the Simulink diagram $\Psi$ of a bounded counter shown in FIG. 12, consisting of an enabled subsystem block and a saturation block. The output y5 increases by 1 at each sample-period when the control input u is positive, and y5 resets to its initial value when the control input u is not positive. The saturation block limits the value of y5 in the range between −0.5 and 7. The translated I/O-EFA P using the method of [1] is shown in FIG. 13. Each c-path in P represents a possible computation of the counter at a sampling instant. For example, the path $\pi_3 = e_2 e_8 e_{10} e_{12} e_{13} e_{19} e_{20} e_{21}$ in I/O-EFA P represents the "reset" behavior, which is the computation sequence of the Simulink diagram $\Psi$ in which the input is zero so that the subsystem is disabled and its output remains as the initial level and hence the saturation is not triggered in the saturation block. There are totally 18 c-paths in the I/O-EFA P, representing all 18 computation sequences in the Simulink diagram $\Psi$.

Some of the computation sequences involving certain sequence of Simulink/Stateflow computations may not be possible. This property is made transparent in our I/O-EFA by showing conflict among the conditions along the corresponding c-paths. In Example 4, five out of 18 computation sequences are possible and the corresponding five c-paths in I/O-EFA are valid. As an example consider an invalid computation sequence "subsystem disabled" and "saturation reaches upper limit". Since the disabled subsystem generates an initial output 2, which is within the saturator's limit, the saturator cannot reach its upper limit. This conflict also shows up in the corresponding c-path $\pi_5 = e_2 e_8 e_9 e_{12} e_{13} e_{19} e_{20} e_{21}$ over the edges $e_2$ and $e_9$, where y5(k):=2 on edge $e_2$, whereas y5(k)>7 on edge $e_9$.

Besides the conflict among the conditions along the edges of a path, some of the impossibilities of certain computation sequences are caused by the initial condition of the system. Consider the saturation condition y5(k)<−0.5 in Example 4. None of the computation sequences with this saturation condition can be executed, since the counter output starts from zero and increments by one each time it counts, and thus the count can never be less than zero. The I/O-EFA model also captures these impossible computation sequences by showing the corresponding c-paths as unreachable from the initial conditions.

Based on the above discussion, the test generation problem for Simulink/Stateflow can be converted to finding the input sequences that execute the corresponding c-paths in the I/OEFA. We obtain the feasible and reachable paths and choose a subset of these paths satisfying a desired coverage criterion.

In summary, our I/O-EFA based test generation for Simulink/Stateflow has the following steps.
- Translate the Simulink/Stateflow diagram to I/O-EFA.
- Find all the paths in I/O-EFA.
- Analyze the paths in I/O-EFA for feasibility and reachability.
- Invalid paths are reported for model soundness and robustness analysis.
- Valid paths satisfying the coverage criterion are used to generate a set of test cases for activating them.

The translation method is implemented in our previous work. The remaining challenges to implement this test generation approach are listed as follows.
- How to identify the valid paths. The feasibility of these paths relies on not only itself but also the initial condition and other paths that may be executed as prefixes.
- How to obtain the input sequences activating the valid paths. Some of the valid paths cannot be activated at the very first time step. These paths require some prefix before they can be activated.

In the next section, we discuss the implementations of our I/O-EFA based test generation approach to deal with these challenges.

X. Implementation of Test Generation Approach

The proposed test generation approach for Simulink/Stateflow has been implemented by applying two different methods. Our previous translation tool SS2EFA has been integrated with these two implementations to support the translation from Simulink/Stateflow diagram to I/O-EFA. The following discussion focuses on the part of test generation to be executed following the translation step.

A. Implementation using Model-Checking

Model-checking is a method to check automatically whether a model of a system meets a given specification. NuSMV [9] is an open source symbolic model checker, which supports the CTL and LTL expressed specification analysis and provides interface to Matlab, so that the test generation tool (written in Matlab script) can call NuSMV for model-checking In this implementation, paths in I/O-EFA are checked against the abstracted I/O-EFA model in NuSMV for feasibility and reachability. Since NuSMV only allows for the representation of finite state systems, the translated I/O-EFA is first converted into a finitely abstracted transition system as defined in Definition 4 below.

The finite abstraction of the model is based on the implementation requirements. Most of the real world systems have finite data space and running time. The finite abstraction is implemented in NuSMV input language as described below.

Variable "steplimit" is set to a value to limit the number of time steps the system can evolve, i.e. to upper bound the discrete time counter k<steplimit in the I/O-EFA model. In the NuSMV file, when the system evolves exceeding the defined value of "steplimit", the variable "location" is given the value "deadend" and has no further outgoing transitions.

Variable "precision" is the limit for the number of significant digits. Since NuSMV can only verify integer values, "precision" determines how the non-interger value in the I/O-EFA model can be transformed into integer. Each non-integer value is transformed as follows: $value_{new} = round(value_{old} * 10^{precision})$, where $value_{old}$ is the value in the I/O-EFA model, and $value_{new}$ is the value in NuSMV file.

Each variable $d_j$ is converted to an integer with upper limit $d_j^{max} \times 10^{precision}$ and lower limit $d_j^{min} \times 10^{precision}$, so that data space is finite. $d_j^{max}$ and $d_j^{min}$ are determined by the requirements on the system.

Definition 4: Given an I/O-EFA P=(L, D, U, Y, Σ, Δ, $L_0$, $D_0$, $L_m$, E), its finite abstracted transition system $P^f$ is a tuple $P^f=(S, U^f, Y^f, Σ, E^f, S_0)$, where $S = L \times D^f$ is the set of its states, where $D^f$ is the finite abstraction of D, $$E^f := \{((l_1, d_1^f), \sigma, u^f, \delta, y^f, (l_2, d_2^f)) \mid \exists d_1 \in d_1^f,$$
$$u \in u^f, y \in y^f, d_2 \in d_2^f :$$
$$(l_1, d_1) \stackrel{\sigma, u, \delta, y}{\rightarrow} (l_2, d_2)\} \text{ is its set of transitions,}$$

$S_0 = L_0 \times D_0^f$ is the set of its initial states, where $D_0^f$ is the finite abstraction of $D_0$, $U^f$ is the finite abstraction of U, $Y^f$ is the finite abstraction of Y.

The finite abstracted transition system is implemented in the NuSMV input language, where:

The locations L of the I/O-EFA model is set as a variable and each location $l_i$ is a value for the variable "locations", Each discrete variable $d_j$ in the I/O-EFA has its corresponding variable in NuSMV file. Data update functions $f_e: D \times U \rightarrow D$ are expressed by the "next( )" functions in the assignment part of NuSMV file, Each input variable $u_k$ is defined in the NuSMV model as a nondeterministic variable. It can choose any value in its range at the beginning of each time-step.

Edges E in I/O-EFA model are mapped to a variable "edgeNum", and each edge $e_i$ corresponds to an integer value of variable "edgeNum". This integer value is determined by the edge number in the I/O-EFA model. Thus, a sequence of "edgeNum" value in NuSMV file represents a sequence of edges, i.e. a path, in the I/O-EFA model.

The corresponding NuSMV file is used to check if the c-paths in the I/O-EFA model are reachable. This is done as an instance of finding a counterexample as prescribed in the following algorithm.

Algorithm 6: A c-path $\pi = e_0^\pi \cdots e_{|\pi|-1}^\pi$ of an I/O-EPA P=(L, D, U, Y, Σ, Δ, $L_0$, $D_0$, $L_m$, E) is determined to be reachable if in the finite abstraction $P^f \models \Phi$ holds, where $\Phi$ is the CTL formula $EF(e_0^{\pi\Delta} \wedge EX(e_1^{\pi\Delta} \cdots EXe_{|\pi|-1}^{\pi}) \ldots )$, meaning path $\pi$ can eventually be activated in the finite abstraction $P^f$. An input sequence that makes it eventually executable is found as a counterexample to the model-checking problem $P^f \models \neg \Phi$.

If a counterexample for $Pf \models \neg \Phi$ is found, then $Pf \models \Phi$ holds, and the sequence of inputs within the counterexample is a test case activating the path $\pi$. The final test suite is the set of input sequences obtained from a subset of reachable paths Π satisfying a desired coverage criterion.

In summary, the model-checking based test generation implementation generates the test cases by the following steps.

Translate the Simulink/Stateflow diagram into I/O-EFA model;

Map the I/O-EFA model to the corresponding NuSMV file;

Extract all the paths from the I/O-EFA model and translate them into corresponding CTL specifications;

Check the CTL representations of the paths against the NuSMV model. Select the reachable paths satisfying the coverage criterion and the set of input sequences activating those paths as the test suite. Report the unreachable paths for the analysis of model soundness and robustness.

The above implementation utilizes the existing model checker NuSMV and automates the test generation for Simulink/Stateflow. However, model-checking process is time-consuming as the state space explodes and the finite abstraction may also cause problems in the test generation. So we investigate another approach as described next.

B. Implementation using Constraint Solving

Mathematical optimization is used to check feasibility of a set of constraints and to select a best element from a set of available alternatives. The standard form of an optimization problem is:

$$\begin{aligned}
\text{minimize} \quad & f(x) \\
\text{subject to} \quad & g_i(x) \leq 0, \, i = 1, \ldots, m \\
& h_i(x) = 0, \, i = 1, \ldots, p
\end{aligned}$$

where $f(x): R^n \rightarrow R$ is the objective function to be minimized over the variable x, $g_i(x) \leq 0$ are called inequality constraints, and $h_i(x) = 0$ are called equality constraints.

Finding whether a c-path $\pi$ of an I/O-EFA is reachable can be converted to a constraint solving problem, which is an optimization problem without regard to an objective value as follows:

$$\text{minimize}_{\xi \equiv (d,u,y)} \quad l$$
$$\text{subject to} \quad P^\pi(x)$$

where, $P^\pi(x)$ is called the path-predicate of the path $\pi$. It is a set of conditions activating the path $\pi$. The above constraint solving problem has solution if the path predicate $P^\pi(x)$ is satisfiable (does not equate to False). The path predicate $P^\pi$ along with its data $d^\pi$ and output $y^\pi$ can be obtained as follows.

Algorithm 7: For a path $\pi = e_0^\pi \ldots e_{|\pi|-1}^\pi$, its path-predicate $P^\pi$ can be computed recursively backward, and data $d^\pi$ and output $y^\pi$ can be computed recursively forward as:

Base step:
$P_{|\pi|}^\pi(d, u, y) := \text{True}$;
$d_0^\pi(d, u, y) := d$;
$y_0^\pi(d, u, y) := y$ Recursion step:
$P_{j-1}^\pi(d, u, y) := G_{e_{j-1}^\pi(d,u,y)} \wedge P_j^\pi(f_{e_{j-1}^\pi}(d, u, y), uh_{e_{j-1}^\pi}(d, u, y))$;
$d_{j+1}^\pi(d, u, y) := f_{e_j^\pi}(d_j^\pi(d, u, y), u, y_j^\pi(d, u, y))$
$y_{j+1}^\pi(d, u, y) := h_{e_j^\pi}((d_j^\pi(d, u, y), u, y_j^\pi(d, u, y))$.

Termination step:
$P^\pi(d, u, y) := P_0^\pi(d, u, y)$;
$d^\pi(d, u, y) := d_{|\pi|}^\pi(d, u, y)$;
$y^\pi(d, u, y) := d_{|\pi|}^\pi(d, u, y)$.

Note: If any of $G_e$ is undefined, it is simply assumed true, ie, $G_e(d, u, y) = \text{True}$, and similarly if any of $h_e$ is undefined, then it is simply assumed to be the same as identity, ie, $h_e(d, u, y) = y$.

Constraint solving problem is constructed to check if $P^\pi(d, u, y) \neq \text{False}$, in which case, the path $\pi$ is feasible. The feasible paths obtained in Algorithm 7 are the candidate paths for test generation. They are further checked to see if they can be reached from the initial condition, i.e. if there exists a feasible path-sequence $\Pi$ starting at the initial condition and ending with the path under evaluation for reachability. The algorithm to determine the feasibility and reachability of a path-sequence $\Pi$ is as follows:

Algorithm 8: Given a path-sequence $\Pi = \pi_0 \ldots \pi$ starting at the initial condition $I(d, u, y)$ ending with the path $\pi$, the feasibility/reachability of $\Pi$ can be checked recursively backward as:

Base step:
$P_{|\Pi|}^\Pi(d, u, y) := P^\pi$;

Recursion step:
$P_{j-1}^\Pi(d, u, y) := P_{j-1}^{\pi_j} \wedge P_j^\Pi(d_{j-1}^{\pi_j}, u_j, y_{j-1}^{\pi_j})$;

Termination condition:
If $P_j^\Pi(d, u, y) = \text{False}$, then $\Pi$ is infeasible and also unreachable, stop;
If $P_j^\Pi(d, u, y) \neq \text{False}$ and $j \neq 0$, then decrement $j$ and return to recursion step;
If $j = 0$, then $\Pi$ is reachable if $P_j^\Pi(d, u, y) \wedge I(d, u, y) \neq \text{False}$, stop.

Given a feasible path $\pi$, if none of the path-sequence with $|\Pi| \leq$ steplimit ending with $\pi$ is reachable, $\pi$ is unreachable within the steplimit. Otherwise, $\pi$ is reachable. Note steplimit is the test case length requirement of the system.

Given a feasible path-sequence $\Pi = \pi_0 \ldots \pi$ ending with path $\pi$, a test input sequence $t_\pi = u_0 \ldots u_{|\Pi|-1}$ activating the reachable path $\pi$ is obtained by letting $u_j \in P^{\pi_j}$, $j = 0 \ldots |\Pi|-1$. This input sequence $t_\pi$ is the test case for path $\pi$.

The constraint solving based test suite is derived with an open source optimization tool CVX [10], written in Matlab. Our test generation tool calls the CVX tool to check the feasibility of the problem.

In summary, this constraint solving based test generation implementation generates the test cases using the following steps.

Translate the Simulink/Stateflow diagram into I/O-EFA model;
Extract all the paths from the I/O-EFA.
Apply Algorithm 7 to obtain the feasible paths;
Apply Algorithm 8 to obtain the reachable paths (the test cases are generated based on the reachable paths satisfying the coverage criterion);
Report the unreachable paths identified in the previous two steps for the analysis of model soundness and robustness.

The above implementation applies the constraint solving to solve for the recursively obtained path predicates. This method does not require finite abstraction of the data space and loading of the model in another tool. This implementation is thus exact (requiring no abstraction) and is able to generate test cases faster than the implementation based on the model checker.

XI. Validation of Test Generation Implementations

Both of the test generation implementations described above, as well as the Simulink/Stateflow to I/O-EFA translation tool, have been incorporated in an automated test generation tool. Upon specifying a source Simulink/Stateflow model file, both of our implementation methods can be executed to output the test suite for the corresponding Simulink/Stateflow diagram.

Example 5

Model Checker Based Test Generator

Consider the I/O-EFA model (see FIG. 2) of the counter system (see FIG. 12). By specifying steplimit=10, precision=0, all variables within $[-2, 10]$, $u \in \{0, 1\}$, and path-covered criterion (all paths be covered), the model checker based test generator generates four reachable paths and the corresponding test cases are shown in Table I.

The test generation time (using Intel Core 2 Duo P8400 2.27 GHz, 2 GB RAM) is 349.3 seconds and the results are as expected.

Example 6

Constraint Solving Based Test Generator

Consider the same I/O-EFA model (see FIG. 13) of the counter system (see FIG. 12). By specifying steplimit=10, $u \in \{0, 1\}$, and path-covered criterion (all paths be covered), the constraint solving based test generator provides five feasible paths as shown in Table II and four of them are reachable ($\pi_3$ is identified as unreachable). The test cases are generated as shown in Table III.

The test generation time (using Intel Core 2 Duo P8400 2.27 GHz, 2 GB RAM) is 102.7 seconds and the results are as expected.

The two test generators provide identical test cases regarding the same Simulink/Stateflow diagram and specifications.

Constraint solving based implementation is able to obtain the result about two times faster than model checker based implementation.

TABLE I

RECHARGEABLE PATHS AND TEST CASES FROM IMPLEMENTATION WITH MODEL-CHECKING

| Path | Test Case (u at each sample time) |
|---|---|
| $e_0 e_3 e_4 e_5 e_6 e_7 e_8 e_{10} e_{12} e_{14} e_{15}$ $e_{16} e_{17} e_{18} e_{19} e_{20} e_{21}$ | 1 |
| $e_1 e_3 e_4 e_5 e_6 e_7 e_8 e_{10} e_{12} e_{14} e_{15}$ $e_{16} e_{17} e_{18} e_{19} e_{20} e_{21}$ | 1, 1 |
| $e_1 e_3 e_4 e_5 e_6 e_7 e_8 e_9 e_{12} e_{14} e_{15}$ $e_{16} e_{17} e_{18} e_{19} e_{20} e_{21}$ | 1, 1, 1, 1, 1, 1, 1, 1, 1 |
| $e_2 e_8 e_{10} e_{12} e_{13} e_{20} e_{21}$ | 0 |

TABLE II

FEASIBLE PATHS FROM IMPLEMENTATION WITH CONSTRAINT SOLVING

| Path No. | Path Predicate | Path Data | Path Outputs |
|---|---|---|---|
| $\pi_0$ | $u(k) > 0 \wedge$ $d' = 0$ | $d(k) := 0$, $d' := 1$, $y3 := 1$, $y5(k) := 0$, $y4(k) := 1$, $d(k+1) := 1$, $k := k+1$ | $y2(k) := 0$ |
| $\pi_1$ | $u(k) > 0 \wedge$ $d' = 2 \wedge$ $-0.5 \leq d(k)$ $\leq 7$ | $y3(k) := 1$, $y5(k) := d(k)$, $y4(k) := d(k) + 1$, $d(k+1) := d(k) + 1$, $k := k+1$ | $y2(k) := d(k)$ |
| $\pi_2$ | $u(k) > 0 \wedge$ $d' = 1 \wedge$ $d(k) > 7$ | $Y3(k) := 1$, $y5(k) := d(k)$, $y4(k) := d(k) + 1$ $d(k+1) := d(k) + 1$, $k := k+1$ | $y2(k) := 7$ |
| $\pi_3$ | $u(k) > 0 \wedge$ $d' = 1 \wedge$ $d(k) < -0.5$ | $Y3(k) := 1$, $y5(k) := d(k)$, $y4(k) := d(k) + 1$ $d(k+1) := d(k) + 1$, $k := k+1$ | $y2(k) := -0.5$ |
| $\pi_4$ | $u(k) \leq 0$ | $y5(k) := 2$, $d' := 0$, $d(k+1) := d(k)$, $k := k+1$ | $y2(k) := 2$ |

TABLE III

TEST CASES FROM IMPLEMENTATION WITH CONSTRAINT SOLVING

| Path Number | Test Case (u at each sample time) |
|---|---|
| $\pi_0$ | 1 |
| $\pi_1$ | 1, 1 |
| $\pi_2$ | 1, 1, 1, 1, 1, 1, 1, 1, 1 |
| $\pi_4$ | 0 |

XII. Conclusion

We presented a translation approach from Stateflow chart to Input/Output Extended Finite Automata (I/O-EFA). A Stateflow state, which is the most basic component of Stateflow chart, is modeled as an atomic model. The composition rules for AND/OR hierarchy are defined to connect the atomic state models. An overall I/O-EFA model is obtained by recursively applying the two composition rules in a bottom-up fashion over the tree structure of the state hierarchy. Rules for further refining the model to incorporate other Stateflow features such as events, historical information, interlevel transitions, etc. have been developed. Finally, the Stateflow model is adapted to resemble a Simulink model, since at the highest level a Stateflow chart is a block in the Simulink library. The size of the translated model is linear in the size of the Stateflow chart. Both the Stateflow and Simulink translation approaches have been implemented in an automated translation tool SS2EFA. The translated I/O-EFA models are validated to preserve the discrete behaviors of the original Simulink/Stateflow models. The translated I/O-EFA models can be used for further formal analysis such as verification and test generation. Generally, for test generation, certain set of the computational paths within one time step are extracted according to the coverage criterion, and checked for their feasibility. The input sequences that can achieve the feasible paths are the test cases.

We also presented an Input/Ouput Extended Finite Automata (I/O-EFA) based test generation approach for Simulink/Sateflow. While preserving the discrete behaviors, a Simulink/Stateflow diagram is translated to an I/O-EFA model, with each path of the I/O-EFA model representing a computation sequence of the Simulink/Stateflow diagram. Paths are inspected for feasibility and reachability. They are further used for test generation and model soundness analysis. Two techniques, model-checking and constraint solving, are applied to implement this approach. Modelchecker based implementation maps I/O-EFA to a finite abstracted transition system modeled in NuSMV file. Test cases are generated by checking each path in I/O-EFA against the model in NuSMV. Constraint solving based implementation utilizes two algorithms to recursively compute the path and path-sequence predicate respectively for capturing the feasibility problems. Test cases are obtained from the predicates of the reachable paths. The performance of both implementations was evaluated with a case study. The results showed that both implementations can generate the expected results and the implementation based on constraint solving is superior to the implementation based on model checker with respect to the speed of test generation.

Although various embodiments have been shown and described in detail, the present invention is not to be limited to the specific embodiments shown as the present invention contemplates numerous variations, options, and alternatives in its implementation as may be appropriate in various situations. For example, the present invention contemplates that different types of diagrams or charts may be used, including diagrams and charts from various graphical modeling environments. The methodology may be implemented in various types of computing devices using any number of types of software to provide instruction sets for performing the logic of the methodologies described herein.

REFERENCES

All references set forth herein are incorporated by reference in their entireties.

[1] C. Zhou and R. Kumar, "Semantic translation of simulink diagrams to input/output extended finite automata," *Discrete Event Dynamic Systems*, pp. 1-25, 2010.

[2] N. Scaife, C. Sofronis, P. Caspi, S. Tripakis, and F. Maraninchi, "Defining and translating a "safe" subset of simulink/stateflow into lustre," in *EMSOFT '04: Proceedings of the 4th ACM international conference on Embedded software*. New York, N.Y., USA: ACM, 2004, pp. 259-268.

[3] A. Gadkari, S. Mohalik, K. Shashidhar, A. Yeolekar, J. Suresh, and S. Ramesh, "Automatic generation of test-cases using model checking for sl/sf models," *4th International Workshop on Model Driven Engineering, Verification and Validation*, 2007.
[4] Simulink/Stateflow, "http://www.mathworks.com/products/simulink/."
[5] Reactis, "http://www.reactive-systems.com/."
[6] T-VEC, "http://www.t-vec.com/."
[7] C. Zhou and R. Kumar, "Modeling simulink diagrams using input/output extended finite automata," Computer Software and Applications Conference Workshops (COMPSACW), 2009 IEEE 33rd Annual, pp. 462-467, 2009.
[8] M. Li and R. Kumar, "Stateflow to extended finite automata translation," Computer Software and Applications Conference Workshops (COMPSACW), 2011 IEEE 35th Annual, pp. 1-6, 2011.
[9] NuSMV, "http://nusmv.fbk.eu/."
[10] CVX, http://cvxr.com/cvx/.

What is claimed is:

1. A method of translation of a chart associated with a graphical modeling environment into an input/output-extended finite automata (I/O-EFA) model, the method comprising:
   receiving a representation of the chart;
   processing the representation of the chart with a computing device by (a) representing atomic models for each individual state of the chart, (b) applying composition rules to interconnect the atomic models while preserving state execution and transition behaviors to obtain the I/O-EFA model.

2. The method of claim 1 wherein the step of processing further comprises incorporating additional features of the chart into the I/O-EFA model by refining the I/O-EFA model at locations where the features of the chart reside.

3. The method of claim 1 further comprising applying a composition rule to integrate the chart and a diagram into the I/O-EFA model, said diagram comprising a plurality of blocks and said diagram being associated with a graphical modeling environment in which blocks within the diagram define semantics for executing the diagram.

4. The method of claim 1 wherein the composition rules comprise a first rule for modeling states with OR-substates and a second rule for modeling states with AND-substates.

5. The method of claim 1 wherein each of the atomic models is represented by a tuple.

6. The method of claim 1 wherein the input/output-extended finite automata model is defined as a tuple P=(L, D, U, Y, $\Sigma$, $\Delta$, $L_0$, $D_0$, $L_m$, E) wherein
   L is a set of locations (symbolic-states),
   $D=D_1 \times \ldots \times D_n$ is a set of typed data (numeric-states),
   $U=U_1 \times \ldots \times U_m$ is a set of typed numeric-inputs,
   $Y=Y_1 \times \ldots \times Y_p$ is a set of typed numeric-outputs,
   $\Sigma$ is a set of symbolic-inputs,
   $\Delta$ is a set of symbolic-outputs,
   $L_0 \subseteq L$ is an initial location,
   $D_0 \subseteq D$ is a set of initial-data values,
   $L_m \subseteq L$ is a final location, and
   E is a set of edges, and each e∈E is a 7-tuple,
   $e=(o_e, t_e, \sigma_e, \delta_e, G_e, f_e, h_e)$, where
      $o_e \in L$ is an origin location,
      $t_e \in L$ is a terminal location,
      $\sigma_e \in \Sigma \cup \{\epsilon\}$ is a symbolic-input,
      $\delta_e \in \Delta \cup \{\epsilon\}$ is a symbolic-output,
      $G_e \subseteq D \times U$ is an enabling guard (a predicate),
      $f_e: \overline{D \times U} \to D$ is a data-update function, and
      $h_e: D \times U \to Y$ is an output-assignment function.

7. The method of claim 1 wherein the step of processing is performed by the computing device according to an instruction set stored on a computer readable storage medium.

8. A system comprising logic performing the method of claim 1 embodied on at least one non-transitory computer readable medium.

9. The method of claim 1 further comprising generating a test for the I/O-EFA model.

10. The method of claim 9 further comprising executing the test for the I/O-EFA model.

11. The method of claim 9 wherein the step of generating the test for the I/O-EFA model comprises extracting all paths from the I/O-EFA, determining whether each of the paths is valid or invalid, and using the valid paths for generating a set of test cases.

12. A non-transitory computer-readable storage medium storing computer-executable instructions that are executed on a processing device, the computer-executable instructions comprising:
   instructions for receiving a data representation of a chart, said chart comprising a plurality of states and said chart being associated with a graphical modeling environment; and
   instructions for processing the data representation of the chart to translate the chart into an input/output-extended finite automata model.

13. The non-transitory computer-readable storage medium of claim 12 wherein the instructions for processing the data representation of the chart to translate the chart into the input/output-extended finite automata model provide for (a) representing atomic models for each individual state of the chart, (b) applying composition rules to interconnect the atomic models while preserving state execution and transition behaviors to obtain the I/O-EFA model.

14. The non-transitory computer-readable storage medium of claim 13 wherein the composition rules comprise a first rule for modeling states with OR-substates and a second rule for modeling states with AND-substates.

15. The non-transitory computer-readable storage medium of claim 13 wherein the instructions for processing further comprise instructions for incorporating additional features of the chart into the I/O-EFA model by refining the I/O-EFA model at locations where the features of the chart reside.

16. The non-transitory computer-readable storage medium of claim 13 wherein each of the atomic models is represented by a tuple.

17. The non-transitory computer-readable storage medium of claim 13 wherein the input/output-extended finite automata model is defined as a tuple P=(L, D, U, Y, $\Sigma$, $\Delta$, $L_0$, $D_0$, $L_m$, E) wherein
   L is a set of locations (symbolic-states),
   $D=D_1 \times \ldots \times D_n$ is a set of typed data (numeric-states),
   $U=U_1 \times \ldots \times U_m$ is a set of typed numeric-inputs,
   $Y=Y_1 \times \ldots \times Y_p$ is a set of typed numeric-outputs,
   $\Sigma$ is a set of symbolic-inputs,
   $\Delta$ is a set of symbolic-outputs,
   $L_0 \subseteq L$ is an initial location,
   $D_0 \subseteq D$ is a set of initial-data values,
   $L_m \subseteq L$ is a final location, and
   E is a set of edges, and each e∈E is a 7-tuple,
   $e=(o_e, t_e, \sigma_e, \delta_e, G_e, f_e, h_e)$, where
      $o_e \in L$ is an origin location,
      $t_e \in L$ is a terminal location,
      $\sigma_e \in \Sigma \cup \{\epsilon\}$ is a symbolic-input,
      $\delta_e \in \Delta \cup \{\epsilon\}$ is a symbolic-output,
      $G_e \subseteq D \times U$ is an enabling guard (a predicate), $f_e: D \times U \to D$ is a data-update function, and $h_e: D \times U \to Y$ is an output-assignment function.

18. The non-transitory computer-readable storage medium of claim 12 further comprising instructions for applying a composition rule to integrate the chart and a diagram into the I/O-EFA model, said diagram comprising a plurality of blocks and said diagram being associated with a graphical modeling environment in which blocks within the diagram define semantics for executing the diagram.

19. The non-transitory computer-readable storage medium of claim 12 further comprising generating a test for the I/O-EFA model.

20. A method of translation of a diagram associated with a graphical modeling environment into an input/output-extended finite automata (I/O-EFA) model, the method comprising:

receiving a representation of the diagram;

processing the representation of the diagram with a computing device by (a) representing atomic models for elements of the diagram, (b) applying composition rules to interconnect the atomic models while preserving state execution and transition behaviors to obtain the I/O-EFA model;

generating a test for the I/O-EFA model using the computing device; and executing the test for the I/O-EFA model using the computing device.

\* \* \* \* \*